United States Patent [19]

Hassler et al.

[11] Patent Number: 5,274,349
[45] Date of Patent: Dec. 28, 1993

[54] CURRENT LIMITING FUSE AND DROPOUT FUSEHOLDER FOR INTERCHANGEABLE CUTOUT MOUNTING

[75] Inventors: Stephen P. Hassler, Muskego, Wis.; Stephen P. Johnson, Olean, N.Y.; John Lapp, Franklin, Wis.

[73] Assignee: Cooper Power Systems, Inc., Coraopolis, Pa.

[21] Appl. No.: 946,961

[22] Filed: Sep. 17, 1992

[51] Int. Cl.$^5$ ............... H01H 71/10; H01H 71/20
[52] U.S. Cl. ................... 337/171; 337/174; 337/181
[58] Field of Search ............... 337/171, 168, 169, 170, 337/172, 173, 174, 175, 176, 177, 178, 179, 180, 181

[56] References Cited

U.S. PATENT DOCUMENTS

| | | | |
|---|---|---|---|
| 3,437,971 | 4/1969 | Mikulecky | 337/158 |
| 3,611,240 | 10/1971 | Mikulecky | 337/178 |
| 3,774,137 | 11/1973 | Carothers | 337/174 |
| 3,825,871 | 7/1974 | Blewitt | 337/171 |
| 3,827,010 | 7/1974 | Cameron et al. | 337/168 |
| 3,863,187 | 1/1975 | Mahieu et al. | 337/162 |
| 4,011,537 | 3/1977 | Jackson, Jr. et al. | 337/171 |
| 4,114,128 | 9/1978 | Cameron | 337/162 |
| 4,184,138 | 1/1980 | Beard et al. | 337/168 |
| 4,540,968 | 9/1985 | Kato et al. | 337/31 |
| 4,542,363 | 9/1985 | Kato et al. | 337/31 |

Primary Examiner—Harold Broome
Attorney, Agent, or Firm—Gregory L. Maag

[57] ABSTRACT

The fuseholder includes a current limiting fuse mounted within a fuse body and a lower contact and hinge assembly. The fuse body has contact assemblies mounted on each end thereof. The lower contact assembly on the fuse body is mounted on a hinge which is rotatably supported on an interchangeable cutout mounting. The current limiting fuse includes a fuse element spirally wound around a spider which extends the length of the fuse body. The fuse element includes a high current fusible element and a low current fuse element. The fusible element includes a plurality of spaced reduced areas and is supported on the spider by support surfaces which are located between adjacent reduced areas of the fusible element. An auxiliary wire also extends the length of the fuse body about the spider. The hinge includes a hinge member rotatably mounted on the interchangeable cutout mounting, a connective member supporting the contact assemblies and fuse body with current limiting fuse, and a latch for latching the hinge member to the connective member in a contracted position. The latch is connected to a trigger wire attached to the lower end of the auxiliary wire to maintain the hinge and connective members in their contracted position. Upon the melting of the trigger wire due to a current overload, the trigger wire releases the latch thereby allowing the connective member to move to an extended position with respect to the hinge member such that the current limiting fuse drops out of the interchangeable cutout mounting.

52 Claims, 10 Drawing Sheets

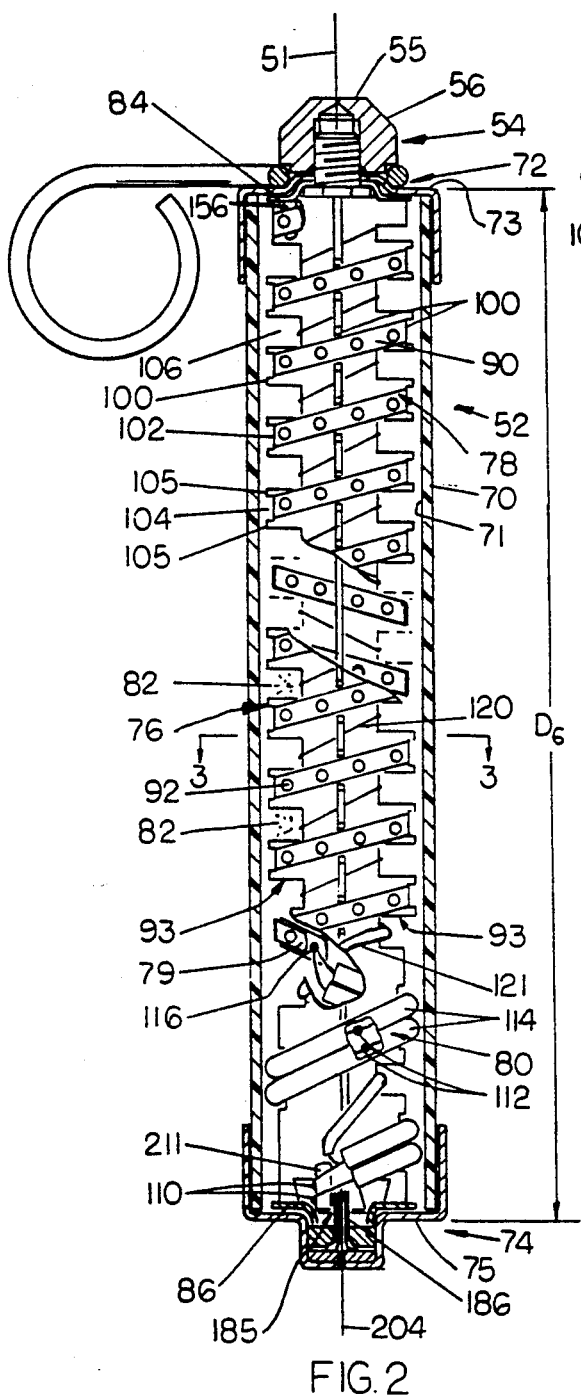
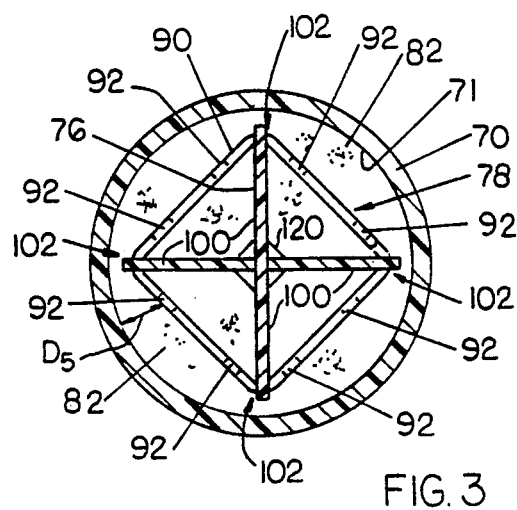
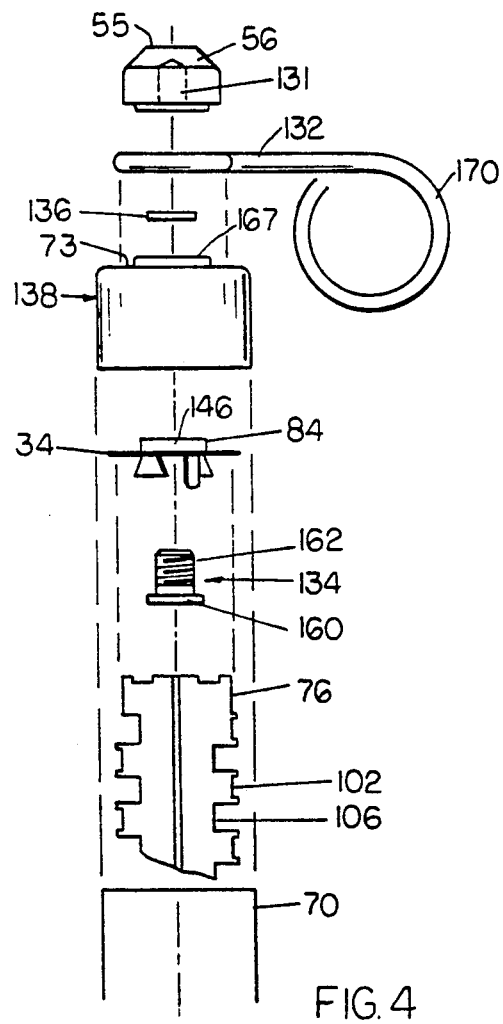

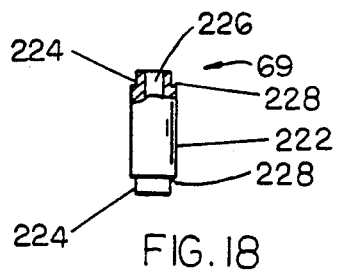
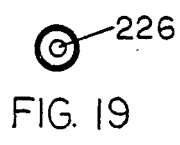
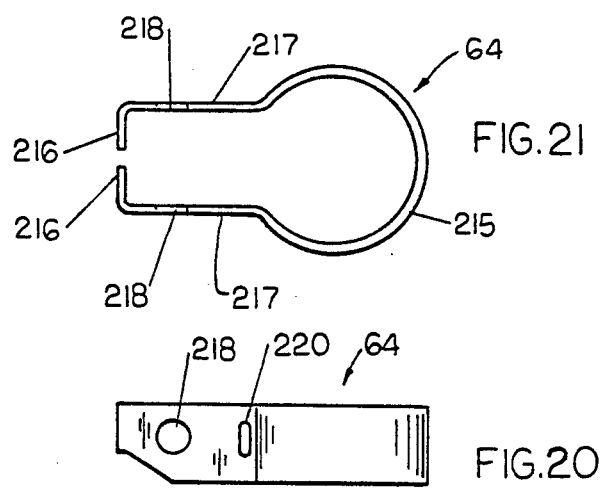
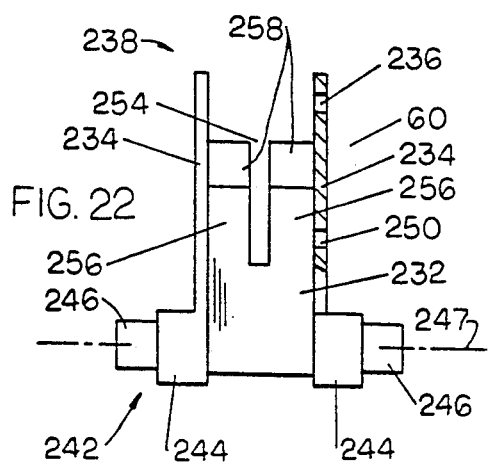
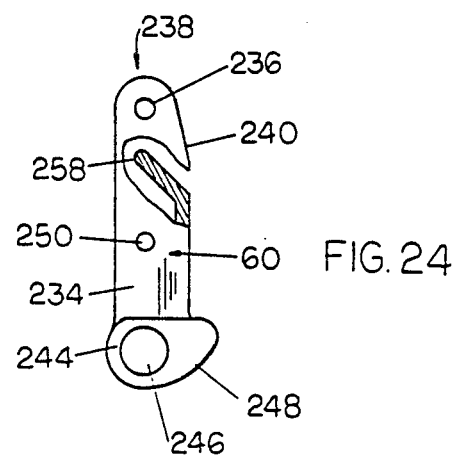
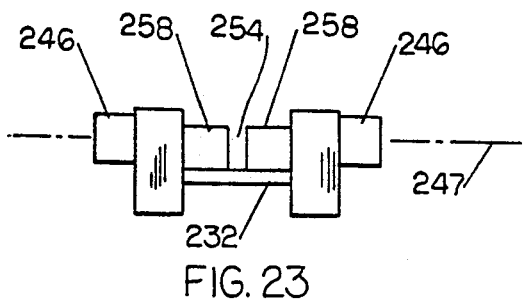
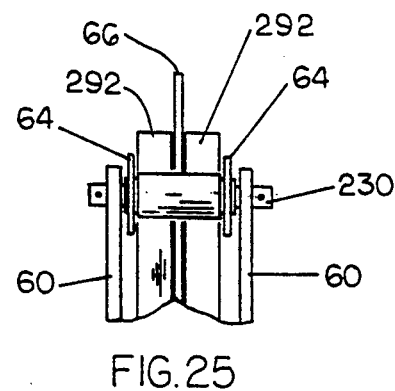

CURRENT LIMITING FUSE AND DROPOUT FUSEHOLDER FOR INTERCHANGEABLE CUTOUT MOUNTING

BACKGROUND OF THE INVENTION

The present invention relates generally to electrical power distribution apparatus. More particularly, the invention relates to current limiting fuses and to dropout fuseholders for spanning the gate between the spaced-apart terminals of an overhead distribution cutout mounting. Still more particularly, the invention relates to a new current limiting dropout fuseholder adapted for installation in the industry-standard interchangeable cutout mountings that are presently used with expulsion fuses.

A fuse is a current interrupting device which protects a circuit by fusing open its current-responsive element when an overcurrent or short-circuit current passes through it. A fuse has these general functional characteristics: (1) It combines both a sensing and interrupting element in one self-contained device; (2) It is direct acting in that it responds only to a combination of magnitude and duration of current flowing through it; (3) It normally does not include any provision for making or breaking the connection to an energized circuit but requires separate devices to perform this function; (4) It is a single-phase device, such that only the fuse in the phase or phases subjected to overcurrent will respond to de-energize the affected phase or phases of the circuit that is faulty; (5) After having interrupted an overcurrent, it is replaced to restore service.

Fuses are typically employed in the electrical utility industry to protect distribution transformers, cables, capacitor banks and other equipment from damaging overcurrents. The fuses are arranged to disconnect the faulted equipment or circuit promptly from its source of supply before damage can occur.

At the present time, two basic types of fuses are employed, the expulsion fuse and the current limiting fuse. Each type employs a fusible element designed to melt when a current of a predetermined magnitude and duration passes through the element.

Expulsion type and current-limiting type fuses effect interruption of overcurrents in a radically different manner. The expulsion type fuse interrupts overcurrents through the deionizing action of gases that are liberated when the fusible element melts. The current-limiting type interrupts overcurrents when the arc that is established by the melting of the fusible element is subjected to the mechanical restriction and cooling action of a sand filler that surrounds the fusible element.

The earliest of these two types of fuses was the expulsion fuse. An expulsion fuse typically employs a relatively short length of a fusible element (within what is commonly termed a "fuselink") contained within a tubular enclosure that is part of a larger assembly known as a "fuseholder". The enclosure used in the expulsion type fuse is lined with an organic material, such as bone fiber. Interruption of an overcurrent takes place within the fuse by the deionizing and explosive action of the gases which are liberated when the liner is exposed to the heat of the arc that is created when the fusible element melts in response to the overcurrent. The operation of the expulsion-type fuse is characterized by loud noise and violent emission of gases, flame and burning debris, all of which pose a danger to personnel who may be in close proximity to the fuse when it operates. Because of its violent mode of operation, this type of fuse has generally been restricted to outdoor usage only. Even when employed outdoors, the expulsion fuse must be mounted well away from the equipment it is intended to protect, as well as other equipment, due to the explosive nature of its operation and its tendency to inject ionized gases into insulating spaces. Further, expulsion fuses mounted on distribution system poles have been known to initiate grass fires resulting from the flaming debris which may be expelled.

Another inherent disadvantage of the expulsion type fuse is that it requires ½ or sometimes 1 full cycle of current before the fuse clears a high current fault. During this time, the equipment the fuse is designed to protect must endure the full available fault current that is allowed to pass through the fuse to the equipment. Potentially damaging energy that will be dissipated in the equipment will be proportional to the formula $I^2T$, where I is the magnitude of the overcurrent and T is the time that the current condition exists. Additionally, the high current that an expulsion fuse allows to flow prior to its interruption at a system current zero tends to cause bothersome voltage dips upon the network causing lights to flicker and sensitive computers and electronic equipment to suffer. Further, expulsion fuses may not clear the overcurrent condition soon enough to prevent sectionalizing fuses, reclosers or other protective relays and circuit devices from also sensing the overcurrent and responding by temporarily and sometimes permanently disconnecting other portions of the network. Additionally, the increased demand for electrical service has led to lower impedance distribution networks and the need for greater interrupting capabilities, sometimes capabilities which exceed those available through the use of expulsion fuses.

The limited interrupting capacity of expulsion-type fuses, coupled with their potentially dangerous mode of operation, their unsuitability for use within buildings or enclosures, their relatively slow clearing time, as well as other factors, prompted the development of the current limiting fuses. The current-limiting fuse has at least three features that have made it extremely desirable for use by the utilities:

(1) Interruption of overcurrents is accomplished quickly without the expulsion of arc products or gases or the development of forces external to the fuse body because all the arc energy of operation is absorbed by the sand filler of the fuse and is subsequently released as heat at relatively low temperatures. This enables the current-limiting fuse to be used indoors, or even in small enclosures. Furthermore, since there is no discharge of hot gases or flame, only normal electrical clearances from other apparatus need to be provided.

(2) A current-limiting action or reduction of current through the fuse to a value less than that otherwise available from the power-distribution network at the fuse location occurs if the overcurrent greatly exceeds the continuous-current rating of the fuse. Such a current reduction reduces the stresses and possible damage to the circuit up to the fault or to the faulted equipment itself, and also reduces the shock to the distribution network.

(3) Very high interrupting ratings are achieved by virtue of its current-limiting action so that current-limiting fuses can be applied on medium or high-voltage distribution circuits of very high available short-circuit currents.

A current-limiting fuse typically consists of one or more silver wire or ribbon elements of a required length which are electrically connected at their ends to a pair of electrical terminations. The assembly—consisting of the fusible element and end terminations—is placed in a tubular housing that is made of a highly temperature-resistant material, and the housing is then typically filled with high-purity silica sand and sealed.

Current limiting fuses require a sufficient minimum element length for proper fault current interrupting performance, and also require sufficient element cross sectional area in order to properly carry the normal or steady-state system currents. To make the fuse shorter than would otherwise be possible, the required element lengths are normally achieved by spirally winding the elements on a support element or "spider" made of a highly temperature-resistant, non-tracking material. Four sided element supports or spiders are most commonly used in current limiting fuses. However, spiders having six or more supporting arms are also used, with some spiders having enough arms such that the element winding approaches a circular shape. A circular shape provides the maximum element length conventionally achieved per turn of winding when the elements are strung directly from supporting arm to the adjacent supporting arm at the appropriate winding pitch. The required cross sectional area of the element is achieved by using ribbon elements up to a maximum practical thickness and, when required for higher current levels, by adding similar elements in parallel. Both paralleling of elements and providing the separation necessary between element turns result in longer spiral windings for the higher current rated fuses.

When operating to clear a high magnitude fault current, the fusible element melts almost instantaneously over its full length. If segments having reduced cross sectional areas are formed in the element, the element melts initially at these reduced area segments, followed by melting of the remaining length of the element. The resulting arc rapidly loses heat energy to the surrounding sand. This energy melts or fuses the sand surrounding the element into a glass-like tunnel structure called a "fulgurite." The rapid loss of heat energy and the confinement of the arc by the molten glass fulgurite literally chokes off the current to a relatively small value. The current is quickly reduced to low levels, brought into phase with the system voltage and interrupted at the earliest occurring current zero of the in-phase current.

Using a metallic ribbon as the high magnitude fusible element is quite common in higher current rated fuses. The ribbon form has the advantage over wire elements of having a larger surface area for thermal conductivity and radiation to the adjacent filler material. Consequently, for a given volume of conductor material, a ribbon element can nave a higher steady-state ampere rating than a wire element, as well as improved interrupting characteristics. Ribbon also has the distinct advantage of lending itself to modification with perforations or notches in order to reduce its cross sectional area in order to provide the desired melt characteristics and exact arc-voltage generation control. When a current-limiting fuse using ribbon-type elements encounters a high-fault current, the ribbon portions having reduced cross-sectional area are heated rapidly to the melting point of the ribbon. This produces a fixed number of arclets in series and, thus, limits the magnitude of the arc-voltage spike produced at that instant. The ensuing arc formation continues to vaporize the remaining portions of the ribbon element and finally produces an arc which occupies the full length of the element path.

On low magnitude currents, such as those that might occur from high-impedance faults or sustained overloads, an entirely different phenomenon occurs. In these instances, the element is heated slowly, and ultimately melts in a limited number or perhaps only one place. One or more short arcs begin and attempt to burn back longer sections of the fusible element. The very high heat of the arc again forms a fulgurite. However, because the initial arc length is short and the rate of element burned back may not be fast enough to force an interruption before the highly concentrated heat source destroys the effectiveness of the developed fulgurite, the fuse will fail to interrupt low magnitude currents. Consequently, to achieve interrupting capabilities for low magnitude fault currents, many of today's current limiting fuses employ a second fusible element in series with the primary element, where the second element is designed to fuse open in response to such low magnitude fault currents and to subsequently interrupt these currents.

An important consideration to utilities in fuse selection and use relates to the ability of the fuse to be physically integrated within the utilities, existing network and the ease and cost of installation and service. In present-day networks, expulsion fuseholders are typically installed in mountings, the combination of which are known as "cutouts." Generally speaking, a cutout consists of a mounting having an insulating support designed to be mounted on a utility pole or crossarm and having a pair of spaced-apart terminals which are designed to receive and electrically engage a fuseholder or a switch assembly or a combination thereof. When installed, the fuseholder or switch bridges the "gate" between the terminals of the cutout mounting.

The term "fuse cutout" usually refers to the mounting, as described above, when combined with a fuseholder. The fuseholder that is most typically employed in a fuse cutout is designed to be easily disconnected from engagement with the terminals of the cutout. One such fuseholder is the "dropout" type which is designed such that, upon actuation of the fuse, one end of the fuseholder becomes disengaged from the cutout mounting. When this occurs, the unrestrained end of the fuseholder rotates down and away from its normal bridging position between the mounting gate while the fuseholder remains supported from the mounting by its still-engaged end. Fuse cutouts provide protection to the distribution circuit by de-energizing and isolating a faulted section of the circuit.

Expulsion cutouts offer a relatively convenient and low cost means of fusing electrical distribution systems. Further, the industry is adopting a dimensional standard for expulsion fuseholders and mountings, such that a fuseholder from one manufacturer will properly fit into the mounting of another manufacture. Further these "interchangeable" cutouts are widely distributed throughout electrical distribution systems in this country, and large numbers of these cutouts are presently in service.

With increasing demands for electrical energy, more reliable service, higher levels of safety, the need for improved overvoltage protection of transformers and more compact systems, the convenience and cost of fuses with expulsion fuse cutouts do not necessarily meet the needs of today's utilities. Many of the aforementioned problems associated with expulsion fuses can be overcome with current limiting fuses. However, convenience and cost are not adequately addressed with prior art current limiting fusing equipment.

Various attempts have been made to overcome the aforementioned problems as evidenced, for example, by the device disclosed in U.S. Pat. No. 3,827,010 issued to Cameron et al. The device of Cameron provides a combination dropout assembly which includes a current limiting fuse disposed in line, and electrically coupled in series, with an expulsion-type fuse such that a full range of protection is provided by the fuse cutout. However, the overall length of the dropout assembly of this invention is longer than the gate (the spacing between the terminals) of commonly used cutout mountings found in existing distribution systems. Thus, in order to effectively utilize the invention of Cameron et al, utilities would have to replace literally millions of cutouts presently in service. Such an approach would be prohibitive, not only from the standpoint of equipment cost, but also, and perhaps more significantly, in view of the monumental labor costs associated with the replacement of these cutouts. Further this device does not adequately address or remedy fire hazards, spacing requirements, problems that may result from partial element damage to the series connected device or the miscoordination which could occur when refusing one of the two series-connected sections.

A similar device is illustrated in U.S. Pat. No. 4,011,537 granted to Jackson et al. In this patent, the current limiting fuse and expulsion fuse are each provided with insulating skirts to overcome the flashover tendency sometimes exhibited in devices of this type. Notwithstanding this feature however, the in-line combination dropout assembly of Jackson et al presents the same drawbacks discussed above with respect to compatibility with equipment now in service.

Another approach to overcoming the problems discussed above is illustrated in U.S. Pat. No. 3,863,187 issued to Mahieu et al. Mahieu et al employs an expulsion-type fuse in series with a current limiting fuse, but disposes the latter "outgate" such that it does not form a part of the dropout assembly. One advantage of this construction is that the size of the current limiting fuse is not dictated by the spacing between the terminals of the cutout mounting, and moreover, the full extent of this spacing is available for accommodating the desired length of the expulsion-type fuse. Thus, this arrangement permits full range protection without adversely effecting the overall coordination of the distribution system. However, one shortcoming of the Mahieu device is that replacement of the current limiting fuse is difficult, particularly in adverse weather conditions. In this arrangement, the current limiting fuse is commonly positioned on the source side of the cutout in order to provide the desired operating characteristics. Thus, linemen are usually required to work on an energized portion of the line when replacing the current limiting fuse in the device described by Mahieu et al since utilities seldom, if ever, de-energize the distribution circuit for the purposes of permitting routine maintenance work. This problem is compounded by the fact that there is no method of readily determining whether the current limiting fuse has also operated. Consequently, whenever the expulsion fuse portion of a device, such as shown in the Mahieu et al patent, actuates, recommended practice is to replace both the expulsion fuse and the current limiting fuse, the latter being subsequently tested to determine whether it is suitable for continued service. Further, the danger of a fire being ignited and the added spacing requirements for expulsion-type fuses remain because of gases and parts that will be exhausted from the expulsion fuse. In addition, space, in excess of the normal expulsion fuse requirements, must be allocated for placement of the current limiting fuse. In addition, proper electrical coordination of the two fuses must be maintained in order to ensure indication of a fuse operation and removal of voltage stress across the blown fuse by the dropout action of the expulsion fuse.

Still another fuse cutout is disclosed in U.S. Pat. No. 4,184,138 issued to Beard et al. The apparatus disclosed in Beard et al is another example of a combination of current limiting and expulsion fuse, a combination designed to fit within the existing in-service cutouts. The design of Beard et al contemplates offsetting the axes of the current limiting and expulsion fuses so that the combination will physically fit within existing interchangeable cutouts, making its use more convenient than the apparatus of Cameron et al., Jackson et al or Mahieu et al. However, the invention surfers from many of the disadvantages inherent with the use of expulsion fuses, i.e., noise, expulsion of flaming arc products, coordination requirements, and the like. Additionally, the extra mounting hardware and mounting components for installing the apparatus is cumbersome and therefor undesirable. Further, as explained with respect to the patent to Mahieu et al, upon operation of the expulsion fuse, the current limiting fuse must also be tested, or replaced and later tested, thus eclipsing any significant cost savings.

Accordingly, despite advances made in fuse technology, further advances would be welcomed by the industry. Specifically, due to the increased demand for use of current limiting fuses and the cost-driven necessity of employing existing cutout mountings, there exists a need for a full-range current limiting fuseholder sized so as to fit within the gate of present in-service interchangeable cutout mountings. Ideally, such a fuseholder would be of the dropout variety to provide indication of a fuse operation, to relieve voltage stress across a blown fuse and for ease of installation and maintenance. The current limiting fuseholder would be entirely of the nonexpulsion type to avoid potential danger to personnel, to eliminate the threat of starting a fire, and to allow the apparatus to be safely mounted closer to the protected equipment or to other structures. The current limiting fuseholder would operate without the noise and voltage dip which accompanies expulsion fuse operation. The current limiting fuseholder would greatly minimize or eliminate the potential for violent failure of the protected equipment. A full range non expulsion current limiting fuseholder would eliminate the possibility of miscoordination or problems that can develop from using partially damaged fuses. Both of these are concerns when using an expulsion fuse for the low current clearing part of the fuse package. Further, a full range current limiting fuseholder provides a hermetically sealed environment for both the high and low current interrupting section of the fuse and ensures that interrupting performance will not be adversely affected by contaminating environmental conditions.

SUMMARY OF THE INVENTION

Accordingly, there is provided a current limiting dropout fuseholder that is particularly adapted for in gate mounting in a conventional interchangeable cutout mounting which has industry standard dimensions. The fuseholder includes a fuse body comprised of a fuse tube having cap assemblies mounted on each end thereof. A fuse element is disposed within the fuse body around a spider which extends the length of the fuse body. The fuse element includes a high current fusible segment and a low current fusible segment. Also, an auxiliary wire extends the length of the fuse body about the spider. The upper end of the auxiliary wire is connected to the upper cap assembly. A trigger wire is connected to the lower end of the auxiliary wire and extends through the lower cap assembly and exteriorly of the fuse body. The auxiliary wire and trigger wire are insulated from the lower cap assembly.

The lower cap assembly on the fuse body is mounted on a hinge which is rotatably supported in the interchangeable cutout mounting. The hinge includes a hinge member rotatably mounted in the interchangeable cutout mounting, a connective member supporting the fuse body, and a latch for latching the hinge member and the connective member in a contracted position relative to one another. The hinge member and connective member are rotatably connected by a hinge joint. The latch holds the hinge member and connective member in a contracted position when the current limiting fuseholder is in an extended position mounted in the interchangeable cutout mounting and conducting normal steady-state system currents. The latch is held in the latched or contracted position by the trigger wire, the end of which is attached to the latch. Upon the melting of the trigger fire during fuse operation, the latch releases the hinge member from the connective member allowing the hinge member to rotate to an extended position which causes the current limiting fuseholder to contract and to drop out of engagement with the upper terminal of the interchangeable cutout mounting. The lower cap assembly also includes a spark gap between the lower cap assembly and the trigger wire at the location where the trigger wire passes exteriorly of the fuse body. Upon experiencing a fault current, arcing across the spark gap helps insure the melting of the trigger wire and release of the latch.

The hinge further includes a current interchange which ensures electrical connection between the hinge member and lower cap assembly and also serves as a spring, biasing the hinge and connective members apart upon release of the latch by the trigger wire.

The length of the current limiting fuse is minimized by helically winding the fusible element about a plurality of support surfaces projecting radially along the longitudinal length of the spider. The fusible element includes a plurality of spaced apart, non-randomly positioned, fulgurite initiators, such as reduced area portions about which a fulgurite first forms when a fault current exists. The fusible element is supported by the support surfaces at locations between the adjacent reduced area portions, so that the fulgurite is initially formed at locations that are spaced apart from the support surfaces and spaced apart from the inner wall of the fuse tube.

The present invention may also include an upper cap assembly having components which nest securely together and are assembled using a single fastener. The fastener may include a port through which sand is inserted into the fuse body during assembly.

The invention may also include a star winding pattern in which recessed or V-shaped sections of the high current fuse element are disposed between the adjacent support surfaces of the spider. Additionally, an advantage may be obtained if the reduced area portions in adjacent turns of the fuse element are staggered or offset from one another so as to allow "nesting" of the fulgurites. By winding the high current fuse element in the star pattern and by offsetting or staggering the reduced area portions of adjacent element turns, as well as by non-randomly positioning the reduced area portions away from the fuse tube and spider support surfaces, the present invention may be manufactured smaller than otherwise achievable, and with dimensions compatible with the industry standard interchangeable cutout mounting.

Thus, the present invention comprises a combination of features and advantages which enable it to substantially advance fuse and fuseholder technology by providing a current limiting fuseholder of the dropout style which may be employed in the industry standard interchangeable cutout mounting and will provide full range of current interruption without the hazards and nuisances associated with the prior arc expulsion type fuses described in the preceding section. These and various other characteristics and advantages of the present invention will be readily apparent to those skilled in the art upon reading the following detailed description and referring to the accompanying drawings.

BRIEF DESCRIPTION OF THE DRAWINGS

For a detailed description of a preferred embodiment of the invention, reference will now be made to the accompanying drawings wherein:

FIG. 2 is a cross-sectional view of the fuse body, upper and lower cap assemblies, and current limiting fuse with its high current fusible element and low current fusible element housed therein;

FIG. 3 is a cross-sectional view or the current limiting fuse and fuse body of the present invention shown at 3—3 in FIG. 2;

FIG. 4 is an exploded view of the upper cap assembly of the fuseholder of the present invention;

FIG. 18 is a side elevational view of a sleeve for the hinge of the present invention;

FIG. 19 is an end view of the sleeve shown in FIG. 18;

FIG. 20 is a side view of the connective member of the hinge;

FIG. 21 is a top view of the connective member shown in FIG. 20;

FIG. 22 is a front view of the hinge member;

FIG. 23 is a bottom view of the hinge member shown in FIG. 22;

FIG. 24 is a side elevational view of the hinge member shown in FIG. 22;

FIG. 25 is a partial front view of the hinge member supported in the connective member shown in FIG. 20 by the sleeve shown in FIG. 18;

DESCRIPTION OF THE PREFERRED EMBODIMENTS

Figure 1:
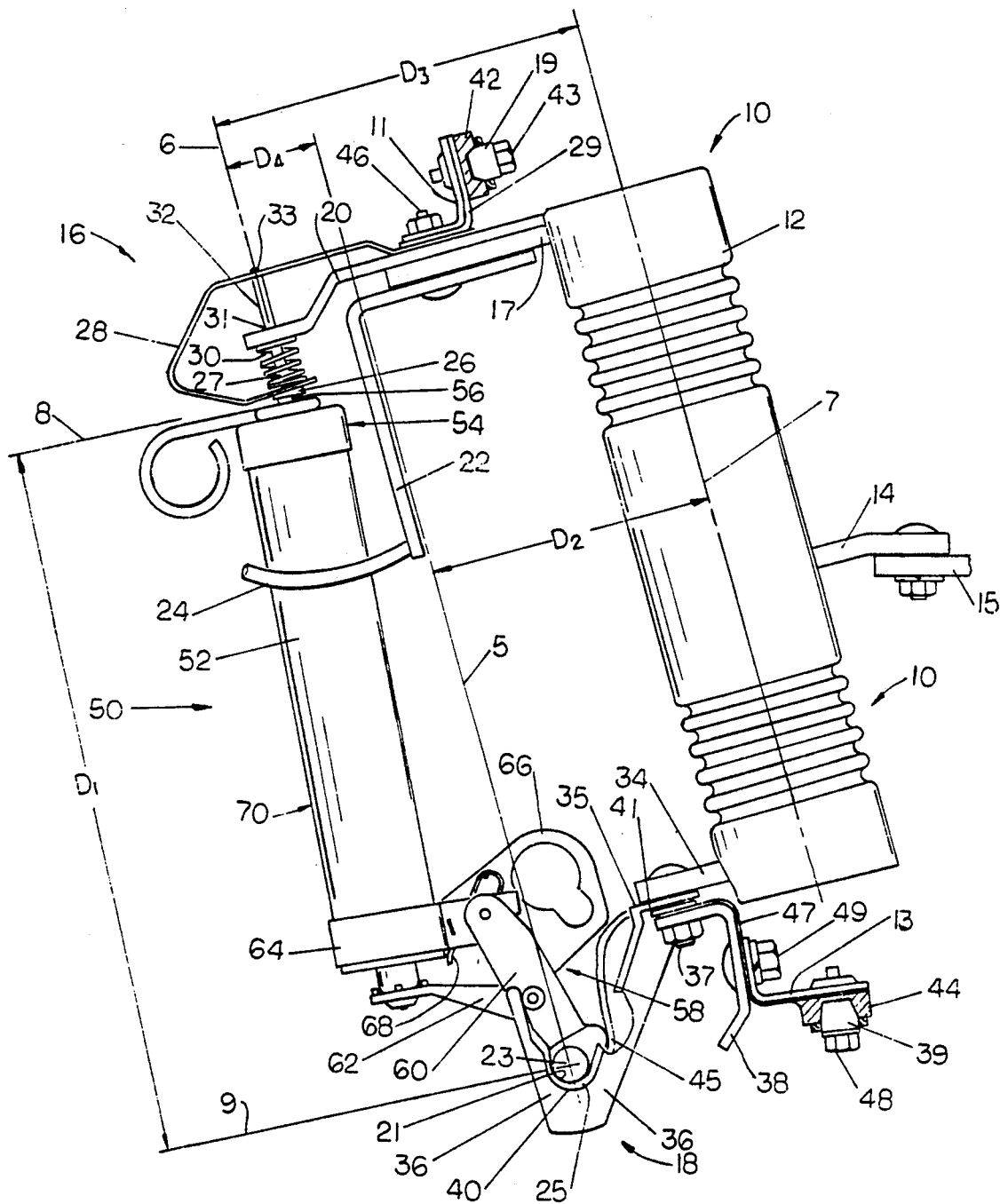
FIG. 1 is a side elevational view of a conventional interchangeable cutout mounting having a current limiting dropout fuseholder of the present invention mounted thereon.

Referring initially to FIG. there is shown a conventionally known interchangeable cutout mounting 10. Cutout mounting 10 is referred to by those in the utility industry and by manufacturers as "interchangeable" because it is designed to be used in conjunction with a number of similarly-rated expulsion type fuseholders as manufactured by a variety of electrical equipment manufacturers. Interchangeable cutout mounting 10 generally comprises insulator 12 and upper and lower terminal assemblies 16 and 18, respectively, which are mounted on opposite ends of insulator 12 on upper and lower terminal support members 17 and 34. Attached at approximately the center of insulator 12 is support arm 14 which may be connected to any conventional support bracket 15 for attaching the cutout mounting 10 on a suitable mounting member, such as the cross arm of a utility pole (not shown).

Upper terminal assembly 16 is attached to terminal support 17 and generally comprises a recoil bar 20 angle member 22 and upper terminal bracket 11, all of which are attached to upper terminal support member 17 by threaded fastener 46. Attached to upper terminal bracket 11 is a terminal pad 42, a terminal clamp 19 and a bolt connector 43 for receiving and clamping an electrical line conductor (not shown). Upper terminal assembly 16 further includes a conducting strap 28 and a cup contact 26 which is integrally formed in conducting strap 28. Conducting strap 28 electrically interconnects cup contact 26 and upper terminal pad 42 through terminal shunt 29. Cup contact 26 is attached to one end of an alignment rod 32 reciprocally disposed in an aperture 31 passing through recoil bar 20 adjacent its terminal end. The other end of rod 32 is attached to strap 28 at 33. A coil spring 30 is disposed between the underside of recoil bar 20 and the top 27 of cup contact 26, in cooperation with conducting strap 28, to allow some reciprocal movement of cup contact 26 with respect to recoil bar 20. Cup contact 26 acts as an electrical connection for receiving the upper electrical contact of a fuseholder when the fuseholder is disposed within interchangeable cutout mounting 10. A pair of load break hook guide arms 24 (one shown in FIG. 1) are mounted on the end of angle member 22 and serve to guide the fuseholder into position within upper terminal assembly 16 and also provide a means for temporarily connecting a load break tool accessory to the cutout mounting 10.

Lower terminal assembly 18 generally comprises lower terminal support member 34 extending from insulator 12, mounting hinge 35 and stop member 38 which are attached to lower terminal support member 34 by threaded fastener 37 Mounting hinge 35 includes a pair of hanger arms 36 and is formed of an electrical conducting material such as brass. Formed within arms 36 are U-shaped elbows 40 for supporting the lower hinge assembly of a fuseholder. U-shaped elbows 40 form a clevis 21 having a center 23 and a bottom point 25. Attached to upper surface 41 of mounting hinge 35 are conducting spring clips 45 biased against the fuseholder to insure good electrical contact between the fuseholder and the mounting hinge 35. Also attached to lower terminal support member 34 by fastener 37 is stop member 38 and lower current shunt 47. A lower terminal bracket 13 is attached to current shunt 47 and stop member 38 by fastener 49. Attached to lower terminal bracket 13 is terminal pad 44, terminal clamp 39 and a bolt connector 48 for receiving and clamping an electrical line conductor (not shown). Lower current shunt 47 provides good electrical contact between mounting hinge 35 and lower terminal pad 44.

Interchangeable cutout mounting 10 is generally available in either of two voltage ratings. These two cutout ratings have rated maximum voltages of 15 KV and 27 KV. respectively. Each of these conventional interchangeable cutout ratings have "standard" dimensions that are utilized in the industry. These standard dimensions allow a fuseholder of a given voltage rating from any of the interchangeable cutout manufacturers to be used in the mounting of the same voltage rating from any of these same interchangeable cutout manufacturers.

For a fuseholder to fit in an interchangeable cutout mounting 10 with the top contact of the fuse body disposed within the recess of the mounting's contact cup 26, the fuse tube portion of the fuseholder must have a diameter less than 1.5 inches. This dimension allows the fuse tube to fit between the arms of the load break hooks 24. Other typical dimensions of interchangeable cutout mountings are indicated as $D_1$, $D_2$, $D_3$ and $D_4$ in FIG. 1. These dimensions, which vary slightly depending upon the particular manufacturer of the interchangeable cutout mounting, are shown in the following table:

TABLE 1

| Interchangeble Cutout Mounting Voltage Rating | Interchangeable Cutout Mounting Dimensions (Inches) | | | |
| --- | --- | --- | --- | --- |
| | $D_1$ | $D_2$ | $D_3$ | $D_4$ |
| 15.0 KV | 11–11 5/16 | 4¼–4 13/16 | 5⅜–6⅜ | 1–1¼ |
| 27.0 KV | 14 7/16–14 13/16 | 4¼–4 13/16 | 5⅜–6⅜ | 1–1¼ |

As generally shown in FIG. 1, $D_1$ is the dimension as measured between the line 8 formed by the lowermost edge of cup contact 26 when spring 30 and conducting strap 28 are in their relaxed, uncompressed positions (spring 30 and conducting strap 28 shown compressed somewhat in FIG. 1 by fuseholder 50) and a parallel line 9 passing through center 23 of clevis 21. $D_2$ is the dimension as measured between central axis 7 of insulator 12 and a line 5, substantially parallel to axis 7, passing through center 23 of clevis 21. $D_3$ is the dimension as measured between central axis 7 of insulator 12 and central axis 6 of cup electrode 26 and rod 32 which is substantially parallel to axis 7. $D_4$ is the difference between $D_3$ and $D_2$.

Referring still to FIG. 1, there is shown current limiting dropout fuseholder 50 of the present invention mounted in interchangeable cutout mounting 10. It is a prime objective of the current limiting fuseholder 50 that it accommodate the standard dimensions of interchangeable cutout mounting 10 with the fuse body 52 aligning concentrically with the mounting's upper cup contact 26. Another important objective of this invention is for the current limiting fuseholder 50 to not only fit the interchangeable cutout mounting 10, but also to be available in voltage and current ratings that meet present and future distribution transformer overcurrent protection requirements.

Continuing with reference to FIG. 1, current limiting dropout fuseholder 50 generally comprises fuse body 52 having upper cap assembly 54 and lower cap and hinge assembly 58. As described more fully below, upper cap assembly 54 includes a top contact 56. Lower cap and hinge assembly 58 includes conducting hinge member 60 which is electrically interconnected through fuse body 52 with top contact 56. Fuseholder 50 is installed in interchangeable cutout mounting 10 between upper and lower terminal assemblies 16 and 18, such that top contact 56 of upper cap assembly 54 is disposed within the recess of cup contact 26, and hinge member 60 is engaged by mounting hinge 35 of lower terminal assembly 18.

Referring now to FIG. 2, current limiting fuse body 52 of dropout fuseholder 50 generally comprises, a high current fusible element 78 and a low current fusible element 80 which are housed in an insulative cartridge or fuse tube 70 having an inner surface 71. Fuse tube 70, preferably made from an epoxy-enriched fiberglass, is a generally tubular member which is closed at each end by upper and lower end caps or closures 72, 74, respectively. The length of fuse body 52 is depicted as $D_6$ in FIG. 2 and is defined by the dimension between upper terminal end 73 and lower terminal end 75. Fuse body 52 houses a supporting structure known as a spider 76 which supports fusible elements 78 and 80. High purity silica sand 82 or other materials having suitable interrupting and insulation characteristics surrounds spider 76 and fusible elements 78 and 80 and fills the unused volume within fuse body 52.

Referring now to FIGS. 2 and 3, spider 76 is made of an inorganic mica in the preferred embodiment. It includes four arms 100 radiating from the longitudinal axis 51 of fuse body 52, three of arms 100 being visible in FIG. 2 Evenly spaced along the length of each arm 100 are element support surfaces 102. A pair of tabs 105 extend from each support surface 102 to help retain element 78 on support surface 102 during manufacture. As shown in FIG. 2, tabs 105 and support surfaces 102 form recesses 104 along the length of spider arms 100.

Fusible elements 80 and 78 are wound over the element support surfaces 102 of spider 76. High current fusible element 78 can be one or more lengths of ribbon, wire or serially connected ribbon and wire. In the preferred embodiment, high current fusible element 78 comprises a ribbon element 90 made of silver, although, other electrically conducting materials may be employed. Ribbon 90 of the preferred embodiment has a melting temperature of greater than 900° C. As shown best in FIG. 2, ribbon element 90 includes an array of reduced area portions 92 which comprise holes that are formed through the thickness of ribbon 90. As alternatives to holes, notches may be formed along the edges of ribbon 90, or combinations of holes and notches may be used to reduce the cross sectional area of ribbon 90. Ribbon 90, with its reduced area portions 92, is helically wound on the element support surfaces 102 of spider arms 100, and the resultant winding assembly is positioned in the fuse body 52.

The size of fuse body 52 of this invention is limited by the dimensional constraints imposed by interchangeable cutout mounting 10 as set out in Table 1 above. Also as mentioned above, fuse tube 70 is required to have an outside diameter less than 1.5 inches in order to fit between guide arms 24. The fuse body 52 with these dimensional limitations must, nevertheless, provide adequate lengths and cross sectional areas of elements 80 and 78 for both proper interrupting performance and current carrying capacity to meet present and future application requirements.

Key to achieving the required element lengths and element cross sectional areas in these relatively small fuse bodies is to minimize the clearances between adjacent turns of the helically wound high current interrupting element 78 and to minimize the clearance between the outer-most diameter of the high current interrupting element 78 and the inner wall 71 of fuse tube 70. These clearances are minimized in the preferred embodiment by non-randomly positioning the reduced area portions 92 in ribbon 90 at locations such that when ribbon 90 is wound about spider 76, reduced area portions 92 do not contact element support surfaces 102 of spider arms 100. Instead, reduced area portions 92 are positioned between spider arms 100, and do not lie over the element support surfaces 102. In the preferred embodiment, reduced area portions 92 are positioned such that the element support surfaces 102 of spider 76 supports ribbon 90 substantially halfway between adjacent reduced area portions 92. In this fashion, as shown in FIG. 2, the reduced area portions 92 in adjacent turns of ribbon 90 are generally aligned in columns 93 that are substantially parallel to fuse axis 51. So positioned, reduced diameter portions 92 are somewhat staggered relative to the reduced area portions in adjacent turns of element 90 when viewed from a direction perpendicular to the edge of elements 78 (or across the shortest element-to-element spacing).

There are significant advantages to maintaining a separation between reduced area portions 92 and element support surfaces 102 of spider arms 100 which allow for construction of current limiting fuses significantly smaller than those presently known and which permit fuse body 52 and fuseholder 50 of the present invention to fit within existing interchangeable cutout mountings 10.

In general, arcing along the path of a high current fusible element 78 begins at the element's reduced area portions 92. This results in the development of larger and hotter fulgurite portions (the molten sand structure that develops during a fuse operation) at these reduced area portions. With most common element winding shapes (rectangular, hexagonal, etc.), the element-to-tube clearance varies along the length of the winding. If the hotter and larger fulgurite producing reduced area portions 92 of the element 78 are positioned in segments of the winding having greater element-to-tube clearance, or are kept at the maximum achievable distance away from the outermost dimensions of the element winding 78—that is, as far removed as possible from the outer most projecting element support surfaces 102 of spider 76—the element 78 can be wound with a larger radius and still fit within a given diameter of fuse tube 70 without resulting in thermal damage to the fuse tube 70 which might otherwise occur and lead to failure of the fuse during a fault current interruption.

Additionally, although the materials typically employed as spiders are generally thought of as being immune to the arcing and heat generated within the tube 70 and as remaining relatively "inert" with respect to those processes, it has been found that the increased arc time across the element support surfaces 102, which results from positioning a reduced area portion 92 on a spider surface, tends to degrade the fuse's interrupting performance by allowing higher let through I²t, which contributes to larger fulgurite size. Further, the fulgurite tends to be larger at points where the element 78 contacts the element support surface 102, as compared to points where like sections of element 78 are completely surrounded by sand 82. In addition, when the reduced area portions 92 are positioned as described and shown in FIG. 2, the maximum width sections of fulgurite that form at the element's reduced area sections 92 are staggered or offset from the widest fulgurite sections in the adjacent turns of element 78 to provide maximum separation between adjacent turns of fulgarite.

In the present invention, positioning the reduced area portions 92 of element 78 away from the spider support surfaces 102 allows for the required element length to be achieved in the diameter and length constraints that are defined by an interchangeable cutout mounting 10. Positioning the reduced area portions 92 away from the spider support surfaces 102 allows for a maximum winding diameter, and thus a maximum achievable length of element per turn, by keeping the portions of the element 78 that will develop the largest and hottest fulgurite away from the segments of the winding having minimum element-to-tube clearance. Likewise, the development of smaller fulgurites and also the stagger in the widest sections of adjacent turns of these smaller fulgurites allows the elements 78 to be wound more closely together, and allows for more turns of element 78 in a given length of fuseholder 50, without risking turn-to-turn short circuits by minimizing the encroachment or the fulgurite in the spacing that separates adjacent turns of element 78.

Further, as described more fully below with reference to FIG. 36, using "star" winding patterns and/or providing spacing of reduced area portions 92 to maximize the stagger between the reduced area portions 92 in adjacent turns of element will allow maximum current and voltage ratings to be achieved in these relatively small current limiting fuse bodies.

Even when utilizing the aforementioned element winding techniques for achieving maximum element lengths in fuse body 52, with the size limitations imposed by the interchangeable cutout mountings on fuse body 52, distribution system parameters must be considered when developing current and voltage ratings for the fuseholder 50 in order to comply with the objective of having fuseholder ratings that meet present any future distribution transformer overcurrent protection requirements.

Normally, the current limiting fuseholder 50 that is to be used in the respective interchangeable cutout mounting 10 must be capable of interrupting overloads or fault currents at system voltages up through the rated maximum voltage of the mounting 10. Or, as is common practice when using current limiting fuses on solidly grounded wye systems, where the fuse application is on a solidly grounded wye system, the fuseholder must be capable of interrupting overload and fault currents at voltages up to and including the system's line to neutral voltage. An 8.3 KV rated maximum voltage fuseholder covers most line to neutral voltage applications for 15 KV voltage class solidly grounded wye systems. A 15.5 KV rated maximum voltage fuseholder covers most line to neutral voltage applications for 27 KV voltage class solidly grounded wye systems. In addition, a 23 KV rated maximum voltage fuseholder would cover line to neutral applications on relatively common 38 KV solidly grounded wye systems.

Full voltage rated fuseholders 50 that will fit the respective voltage rated interchangeable cutout mounting 10 will have a single high current fusible element winding 78 that will allow for the longer element lengths that are required for successful overload or fault current interruptions when operating up to the cutout's rated maximum voltage. Because of the lower operating voltages in line to neutral applications—that is, up to 8.3 KV in a 15 KV mounting and 15.5 KV in a 27 KV mounting—shorter element lengths are acceptable in such applications. In some cases where these shorter element lengths are acceptable, parallel or multiple element windings 78, as are necessary for higher current rated fuses, may be employed in fuseholder 50 mounted in interchangeable cutout mounting 10. The following Table 2 summarizes the maximum current ratings for current limiting fuseholders 50 that will fit 15.0 KV and 27.0 KV interchangeable cutout mountings 10:

TABLE 2

|  | 15.0 KV Cutout Mounting 10 | | 27 KV Cutout Mounting 10 | | |
| --- | --- | --- | --- | --- | --- |
|  | Full Voltage Rated (15.0 KV) | Line to Neutral Voltage Rated (8.3 KV) | Full Voltage Rated (27 KV) | 27 KV Line to Neutral Voltage Rated (15.5 KV) | 38 KV line to neutral voltage Rated (23 KV) |
| Maximum Current Rated Fuseholder 50 | 25 amps | 40 amps | 18 amps | 30 amps | 20 amps |

In the preferred embodiment, silver ribbon 90 has a width in the range of 0.125 to 0.250 inches, and preferably 0.188 inches, and a thickness of approximately 0.002 to 0.006 inches, depending on the current rating of the fuse. The length and number of parallel ribbon elements 90 is dependent upon the current and voltage rating of the fuseholder 52. Typically, the fuse body 52 for use in a 15 KV cutout mounting will have a length $D_6$ shown in FIG. 2 of approximately 8.84 inches, while fuse body 52 for a 27 KV cutout mounting will have a length $D_6$ of approximately 12.35 inches. The following Table 3 summarizes the maximum allowable dimensions for fuse body 52 and the maximum number of parallel ribbon elements 90, as well as the typical length of these elements 90, that will be used for the fuseholder 50 voltage ratings that were summarized in Table 2 above:

inside wall 71 of fuse tube 70, at each element support surface 102, is less than 0.20 inches and preferably approximately 0.13 inches for all voltage and current ratings. When utilizing the aforementioned technique for allowing minimal element-to-tube clearance—that is, positioning the reduced area portions 92 of element 78 between and not in contact with the element support surfaces 102—then in the preferred embodiment, the clearance $D_5$ (FIG. 3) between the element 78 at the center of the element's reduced area portions 92 and the inside wall 71 of fuse tube 70 is between approximately 0.18 and 0.25 inches and preferably is approximately 0.23 inches as measured along a radius from axis 51. It is also preferred that the center of reduced area portions 92 be at least approximately 0.18 inches from element support surfaces 102. Positioning the reduced area portions 92 away from the element support surfaces 102 also allows for minimizing clearance between adjacent

TABLE 3

| Cutout Mounting 10 Voltage Rating | Maximum Fuse Body 52 Dimensions | | Fuse Body Voltage Rating | Maximum No. of Parallel Elements 90 | Typical Lengths of Element 90 |
| --- | --- | --- | --- | --- | --- |
|  | Fuse Tube 70 Outside Diameter | Length ($D_6$) |  |  |  |
| 15 KV | 1.5 inches | 9.5 inches | 8.3 KV | 2 | 20.4 |
| 15 KV | 1.5 inches | 9.5 inches | 15.0 KV | 1 | 34.0 |
| 27 KV | 1.5 inches | 13.0 inches | 15.5 KV | 2 | 34.0 |
| 27 KV | 1.5 inches | 13.0 inches | 23.0 KV | 1 | 48.1 |
| 27 KV | 1.5 inches | 13.0 inches | 27.0 KV | 1 | 45.8 |

Referring still to FIGS. 2 and 3, ribbon element 90 (or parallel elements 90 in the case of the higher current rated fuseholders 50) is helically wound over spider 76, and in the preferred embodiment is supported every quarter turn by element support surface 102. Given the varying width of ribbon and pitch that may be employed, the adjacent ribbon turns will be separated by a substantially uniform distance within the range of approximately 0.33 to 0.53 inches as measured parallel to axis 51 for a single, non-parallel ribbon element 90 (0.40 turns of the element winding as was explained previously. The pitch of element 90 in fuseholder 50 having a single ribbon element 90 is preferably between approximately 0.50 and 0.66 inches while the pitch for dual element windings is between approximately 0.85 and 1.06 inches. Typical ribbon element 90 winding parameters that will provide successful fuse interrupting performance when utilizing this reduced area portion placement technique are summarized in the following Table 4.

TABLE 4

| Cutout Mounting 10 Voltage Rating | Fuseholder 50 Voltage Rating | Winding Pitch | No. of Turns of Element 90 | Spacing Between Adjacent Reduced Area Portions 92 | Axial Spacing Between Adjacent Elements 90 |
| --- | --- | --- | --- | --- | --- |
| 15.0 KV | 8.3 KV | 0.96" | 6.1 turns | 0.42" | 0.49" |
| 15.0 KV | 15.0 KV | 0.58" | 10.5 turns | 0.41" | 0.38" |
| 27.0 KV | 15.5 KV | 0.90" | 10.1 turns | 0.42" | 0.49" |
| 27.0 KV | 23.0 KV | 0.58" | 14.9 turns | 0.41" | 0.38" |
| 27.0 KV | 27.0 KV | 0.58" | 14.1 turns | 0.41" | 0.38" | to 0.67 inches for a winding having parallel elements 90). In the preferred embodiment, the helical winding of ribbon 90 has a radius of between approximately 0.48 and 0.65 inches as measured from axis 51 to support surfaces 102 (0.54 inches being most preferred) and reduced area portions 92 are uniformly spaced apart, center to center, a distance of between approximately 0.35 to 0.50 inches. The fuse tube 70 of the preferred embodiment has an outside diameter of approximately 1.48 inches and an inside diameter of approximately 1.36 inches, and the separation between element 90 and the As best shown in FIG. 2, notches 106 are normally formed between element support surfaces 102 of spider arms 100. In the preferred embodiment, these notches 106 are formed to a depth of 0.25 below the element support surface 102. The width of these notches 106 is the difference between the winding pitch and the sum of the space on the element support surface 102 occupied by the ribbon element 90 and the width of element position tabs 105 at each side of the element, typically 0.05 inches wide. These notches 106 serve to reduce the probability of flash overs between adjacent turns of ribbon element 90 during fault current interruptions, and also to allow for proper positioning of the auxiliary wire 120, described in more detail below.

Referring still to FIG. 2, connected in series with high current fusible element 78 is low current fusible element 80. The series connector between fusible elements 78 and 80 is formed by copper conducting strap 79. Conducting strap 79 is supported on spider 76. Low current fusible element 80 is designed to operate at a predetermined current level below that which high current fusible element 78 is designed to operate. In the preferred embodiment, low current fusible element 80 comprises one or more parallel connected conducting wires 110, which are preferably formed of silver or other good electrically conductive material and insulated in a silicone rubber covering 114. The covered wires 110 are then helically wrapped about the lower section of spider 76. One end of each of the wires 110 is attached to conducting strap 79 at termination point 116 by soldering. The other ends of wires 110 are conductively attached to lower element termination 86 also by soldering. Before installation, when wires 110 are formed from electrically conductive material having a melt temperature substantially greater than 220° C., each wire 110 is comprised of two approximately equal lengths of wire that are soldered together as at junction 112 with a solder having a substantially lower melting temperature than that of wire 110. The electrically conductive material used for wire 110 or the solder used at unction 112 has thermal characteristics causing it to melt at a temperature consistent with the time current characteristic requirements of the fuse. Although junctions 112 are completely insulated by covering 114, for clarity, wires 110 are depicted in FIG. 2 with a portion of covering 114 cut away.

Referring still to FIG. 2, also disposed within fuse body 52 is auxiliary wire 120. Preferably, auxiliary wire 120 is formed of silver for higher current rated ruses and a conductor of higher resistivity for lower current rated fuses. Auxiliary wire 120 is helically wound about spider 76 in the same direction as the helix formed by ribbon 90 and wires 110, and is wound so as to be concentrically disposed within the helix formed by ribbon 90 and wires 110. In this fashion, auxiliary wire 120 does not contact ribbon 90 or wires 110 except, as described below, near its upper point of termination. The lower segment 121 of auxiliary wire 120 is insulated in a silicone rubber covering as it enters the space occupied by the helix formed by low current fusible element 80. The upper end of auxiliary wire 120 is attached to upper element termination 84. As later described in more detail with reference to FIG. 13, the lower end of auxiliary wire 120 terminates on conducting receptacle 186 which is retained in a central recess 185 formed in the lower end of spider 76. A conducting insert 188 is inserted into receptacle 186 and is electrically connected to a trigger wire 204 which preferably is made of high strength and high electrical resistance nichrome. For lower current rated fuses, the trigger wire 204 is made from a material such as "thermite" that will sustain the melting process once initiated by an initial arc to the wire. Trigger wire 204 extends outside of fuse body 52 through lower closure 74 for engagement with lower cap and hinge assembly 58. Conducting receptacle 186, insert 188 and trigger wire 204 are all electrically insulated from lower closure 74.

Figure 6:
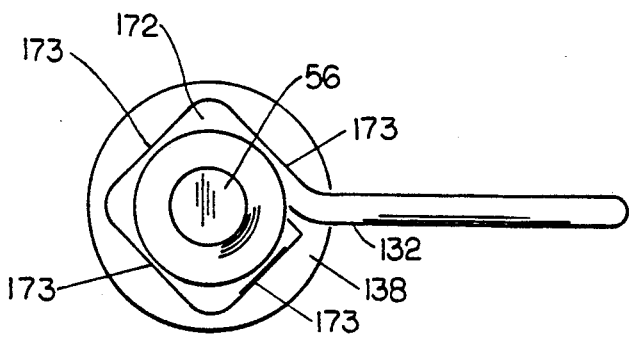
FIG. 6 is a top view of the upper cap assembly of FIG. 5.
Figure 5:
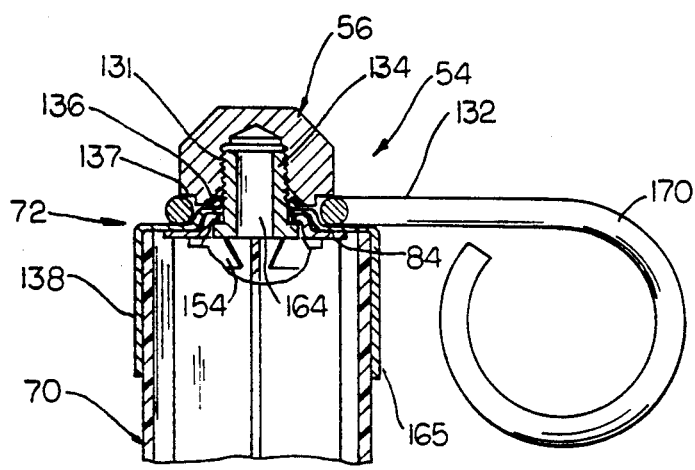
FIG. 5 is a partial cross-sectional view of the upper cap assembly of FIG. 4 assembled on the fuse body.

Referring now to FIGS. 4-6, there is shown the upper cap assembly 54 of fuseholder 50 and top closure 72 of fuse body 52. As particularly shown in FIGS. 4 and 5, upper cap assembly 54 generally comprises top contact 56, pull ring 132, threaded stud 134 and O-ring seal 136. Upper cap assembly 54 is integrated with upper closure 72 which generally comprises top end cap 138 and upper element termination 84. Top contact 56 and upper closure 72 are attached and their position relative to one another maintained by the use of a single fastener, stud 134. The upper terminal end 55 of top contact 56 is approximately 0.75 inches above the upper terminal end 73 of fuse body 52.

Figure 7:
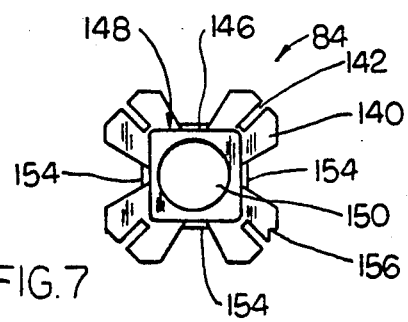
FIG. 7 is a top view of the upper element termination member for the fuse.
Figure 8:
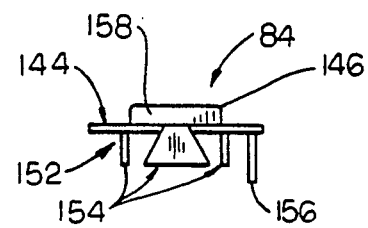
FIG. 8 is a side elevational view of the upper element termination member shown in FIG. 7.

Referring now to FIGS. 7 and 8, upper and lower element terminations 84, 86 respectively are formed of a conducting material, preferably copper, and serve as supports for spider 76 and as landings and termination points for fusible elements 78, 80 and for the upper end of auxiliary wire 120. As shown particularly in FIG. 7, upper termination 84 includes four spider supports 140, each of which includes a receiving slot 142 for receiving arms 100 of spider 76. The upper surface 144 of upper termination 84 includes an embossed ridge 146 having a generally square-shaped perimeter 148. Centrally disposed within upper surface 144 is a hole 150 for receiving the shank of threaded stud 134. As best shown in FIG. 8, embossed ridge 146 forms a recess 158 for capturing the square head 160 of stud 134. Formed on the lower surface 152 of upper termination 84 are extending tabs 154 and 156. Four tabs 154 are used for supporting and for maintaining the separation between spider arms 100. As shown in FIG. 2, tab 156 forms a landing and termination point for ribbon 90 and auxiliary wire 120 which are wound about and soldered to tab 156.

Figure 9:
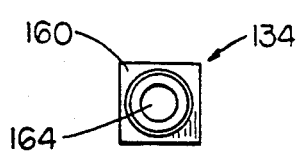
FIG. 9 is a top view of the stud for the upper cap assembly.
Figure 10:
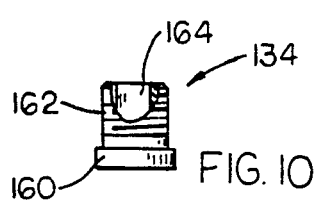
FIG. 10 is a side elevational view of the stud shown in FIG. 9.

Referring now to FIGS. 9 and 10, stud 134 is shown generally comprising square head 160 and threaded shank 162. Preferably, stud 134 is made of a copper alloy, but can be made of other suitable conducting materials. Head 160 is sized so as to be received within recess 158 of upper termination 84 which prevents rotation of head 160. Stud 134 includes a central bore 164 disposed through the stud's longitudinal axis which serves as an entry port for sand 82 into fuse body 52.

Figure 11:
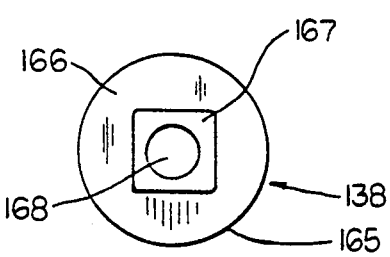
FIG. 11 is a top view of the upper end cap of the upper cap assembly.
Figure 12:
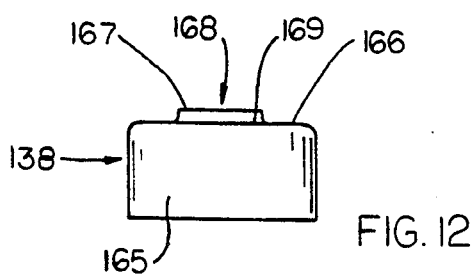
FIG. 12 is a side elevational view of the upper end cap shown in FIG. 11.

Referring now to FIGS. 11 and 12, top cap 138 generally comprises a cylindrical body 165. Body 165 includes an upper surface 166 and an embossed contact 167 generally square in shape and having a central bore 168 formed through embossed contact 167. Embossed contact 167 forms a recess 169 adapted for receiving embossed ridge 146 of upper termination 84 as shown in the assembled view of FIGS. 4 and 5. Top cap 138 is preferably formed of a copper alloy such as 110 copper.

Referring again to FIGS. 4 and 5, body 165 of top end cap 138 has an inner diameter slightly greater than the outside diameter of fuse tube 70. Upon assembly of fuse body 52, top cap 138 is disposed about and magneformed to the upper tubular end of fuse tube 70. An epoxy adhesive sealant is spread between fuse tube 70 and end cap 138 before magneforming.

Referring again to FIGS. 5 and 6, pull ring 132, preferably made of galvanized steel or stainless steel, is employed to engage and disengage fuseholder 50 from interchangeable cutout mounting 10. Pull ring 132 includes a ring portion 170 and a square form section 172 having straight inner sides 173 dimensioned so as to tightly receive and engage embossed contact 167 of top end cap 138. Upon assembly of fuse body 52, square head 160 of stud 134 nests within embossed ridge 146 of upper termination 84, which in turn, nests within embossed contact 167 of top end cap 138. Shank portion 162 of stud 134 extends through holes 150 and 168 of upper termination 84 and top cap 138 respectively. Square form section 172 of pull ring 132 is disposed about embossed contact 167 of top end cap 138 with shank 162 of stud 134 disposed therethrough O-ring 136 is disposed about shank 162. Top contact 56 includes a central threaded bore 131 which engages threaded stud 134. As top contact 56 is tightened about stud 134, O-ring 136 seals between top contact 56, stud 134, and top end cap 138. Top contact 56 includes a recess or step 137 sized to permit pull ring 132 to fit between top end cap 138 and top contact 56 when top contact 56 is tightened about stud 134 to the extent required for O-ring 136 to be sufficiently compressed to seal as described above.

Figure 13:
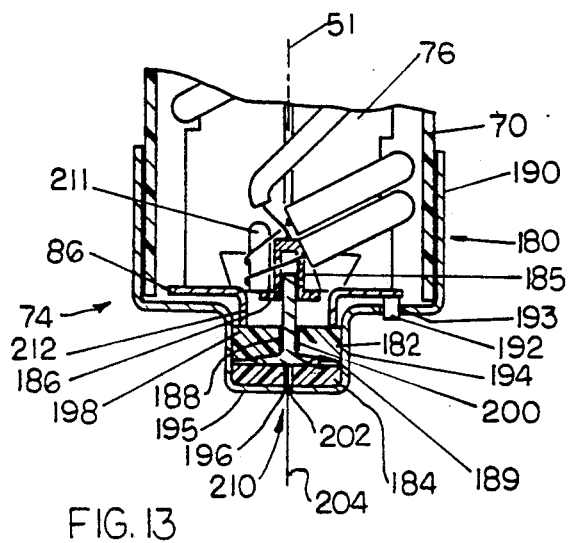
FIG. 13 is a partial cross-sectional view of the lower cap assembly mounted on the fuse body.

Referring now to FIG. 13, there is shown lower closure 74 which generally comprises bottom end cap 180, seal member 182, and positioner 184. Bottom end cap 180 is formed of copper alloy, such as copper 110, or other conducting material and generally includes a cylindrical body portion 190 disposed about fuse tube 70 and a generally cylindrical reduced diameter extension 194 attached to and extending from the center of cylindrical body portion 190 thereby forming an interior recess 198 within cap 180. Extension 194 and body 190 are generally coaxially aligned with fuse axis 51. A hole 196 is formed substantially in the center of lower surface 195 of extension 194 at the intersection With axis 51.

Figure 14:
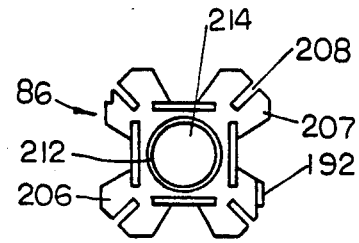
FIG. 14 is a bottom view of the lower element termination member of the lower cap assembly.
Figure 15:
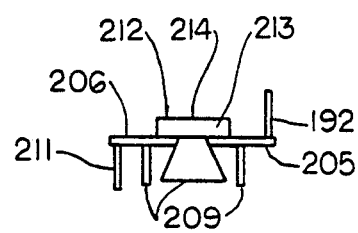
FIG. 15 is a side elevational view of the lower element termination member shown in FIG. 14.

Referring now to FIGS. 14 and 15, lower element termination 86 includes four spider supports 207, each of which includes a receiving slot 208 for receiving arms 100 of spider 76. The lower surface 206 of lower termination 86 includes a conducting tab 192 and an embossed ridge 212 generally circular in shape, and forming a recess 213. Centrally disposed through recess 213 of lower termination 86 is bore 214 which is substantially aligned with fuse axis 51. Formed on the upper surface 205 of lower termination 86 are angular tabs 209 which are used to provide support for and maintain the separation of arms 100 of spider 76. Upper surface 205 further includes tab 211 used as a landing and termination point for conducting wires 110 of low current fusible element 80 as shown in FIG. 2. Wires 110 are preferably wrapped about and soldered to tab 211.

As best shown in FIG. 13, lower element termination 86 is electrically connected to bottom end cap 180 by means of conducting tab 192. Tab 192 extends through hole 193 formed in bottom end cap 180. The portion of tab 192 extending through end cap 180 is bent over and soldered to cap 180 at this point with ridge 212 being disposed in central recess 198 of bottom end cap 180 to center spider 76 within fuse tube 70. Seal 182 comprises a rubber washer. Positioner 184 comprises an insulating washer made of an electrically insulating material such as nylon. Seal 182 and positioner 184 are coaxially disposed within central recess 198 of extension 194. Seal member 182 and positioner 184 include central bores 200 and 202, respectively, which are aligned with hole 196 in bottom end cap 180. Bore 200 of seal 182 has a diameter larger than the diameter of bore 202 of positioner 184. A high strength nichrome trigger wire 204 is brazed or soldered to conducting insert 188 which preferably is formed of brass. Insert 188 includes a flange 189 which is disposed between seal member 182 and positioner 184.

Referring to FIGS. 2, 13, and 14, a flanged conducting receptacle 186 adapted to receive and electrically engage insert 188 is disposed through hole 214 in lower termination 86. Receptacle 186 is retained in central recess 185 formed in the lower end of spider 76 along fuse axis 51. Receptacle 186, preferably made of brass, is attached to, and in conducting engagement with, auxiliary wire 120 as previously described. Conducting insert 188 is inserted into conducting receptacle 186 through bore 214 of lower element termination 86 during assembly of fuse body 52 with nichrome trigger wire 204 extending through bores 200, 202, and 196, and extending from fuse body 52. The lower end of auxiliary wire 120, receptacle 186, insert 188 and trigger wire 204 are all electrically insulated from lower cap and hinge assembly 58. As best shown in FIG. 13, a spark gap 210 is formed between trigger wire 204 and bottom end cap 180. Gap 210, which preferably is approximately 0.040 inches for all voltage and current ratings for fuseholder 50, is provided to assist in causing fuseholder 50 to drop out of engagement with interchangeable cutout mounting 10, as explained more fully below.

Figure 16:
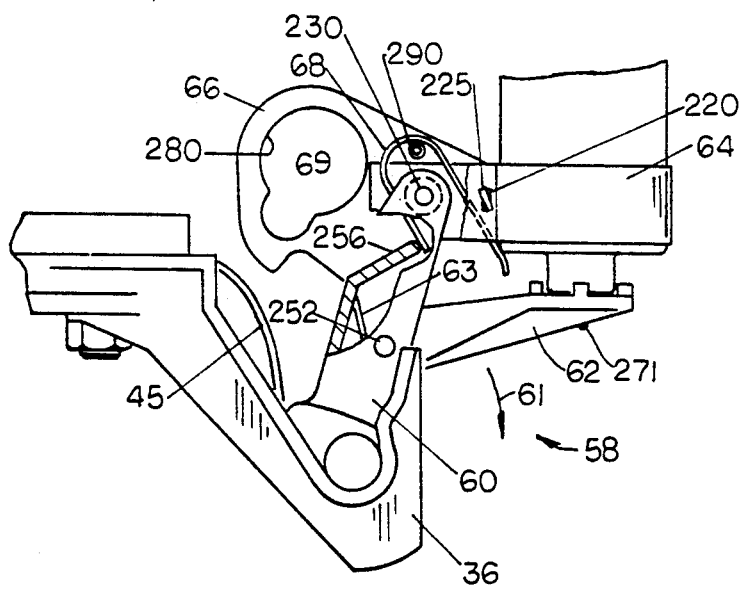
FIG. 16 is a side elevational view, partly in cross-section, of the lower cap and hinge assembly in the latched position and mounted in an interchangeable cutout mounting.

Referring now to FIG. 16, fuse body 52 is attached to lower cap and hinge assembly 58. Lower cap and hinge assembly 58 generally comprises a hinge member 60, latch and latch plate members 62, 66, spring 63, current interchange 68 and connective member 64. As hereinafter described in more detail, hinge member 60 mounts lower cap and hinge assembly 58 into interchangeable cutout mounting 10. Connective member 64 is hinged to hinge member 60 and mounts current limiting fuse body 52 onto hinge assembly 58. Latch and latch plate members 62, 66, respectively, mechanically retain the hinge member 60 and connective member 64 in a contracted or charged position while the fuseholder 50 is in an extended position and mounted within interchangeable cutout mounting 10. When a fault current severs trigger wire 204 to release latch member 62, latch member 62 rotates to release latch plate 66 so as to permit the hinge member 60 and connective member 64 to rotate into a extended and released position allowing the fuseholder 50 to contract and drop out of interchangeable cutout mounting 10. Current interchange 68 ensures electrical contact between hinge member 60 and bottom cap 180 when the fuseholder 50 is in its extended position in electrical engagement with upper terminal assembly 16 of cutout mounting 10, and also acts as a biasing means to bias the connective member 64 into the extended position relative to hinge member 60 upon release of latch 62 and latch plate 66.

Connective member 64, shown in detail in FIGS. 20 and 21, functions like a clamp and generally includes a strap portion 215 and a pair of hinge supporting members 217 attached thereto. The ends 216 of hinge supporting members 217 are bent toward one another and formed at substantially right angles to hinge supports 217. Aligned holes 218 are formed in hinge supporting members 217. Similarly, a pair of aligned slots 220 are formed opposite one another in hinge supporting member 217. As shown in FIG. 16, a clamping strap or tie 225 is disposed through aligned slots 220 and is bent or twisted at both ends in order to draw together hinge supporting members 217 and secure and clamp strap portion 215 of connective member 64 about bottom end cap 180 of bottom closure 74.

Referring now to FIGS. 22-25 hinge member 60 generally comprises base portion 232 and a pair of outwardly extending side members 234 forming a channel. Side members 234 include aligned holes 236 formed in the upper end 238 of side member 234 adjacent tapered edge 240. Attached to the lower end 242 of each side member 234 are shoulder portions 244, which include pivot means such as trunions 246 extending outwardly therefrom. Trunions 246 are coaxially formed along axis 247. Shoulders 244 include cam-like electrical contact surfaces 248 adapted for electrical engagement with conducting spring clips 45 of mounting hinge 35 shown in FIG. 1. Also as shown in FIG. 1, when disposed in hanger arms 36, trunion axis 247 passes through center 23 of clevis 21. Side members 234 further include aligned holes 250 for receiving pin 252, shown in FIG. 16 and which as described below, supports rotatable latch member 62. Holes 250 are disposed in side members 234 between trunions 246 and holes 236. As best shown in FIGS. 22 and 23, base 232 extends between side members 234 and includes slot 254. Slot 254 generally bisects base 232 forming a pair of leg portions 256. The ends 258 of legs 256 extend outward from base 232 at an angle which is substantially equal to 45°. The ends 258 of legs 256 form a shoulder which engages and supports one end of the current interchange 68 as shown in FIG. 16.

Sleeve 69, best shown in FIGS. 18 and 19, generally comprises a cylindrical body 222 having reduced diameter portions 224 disposed at each end. Reduced diameter portions 224 join body 222 at shoulders 228. A central bore 226 is longitudinally formed through sleeve 69. Referring again to FIGS. 16 and 20, reduced diameter portions 224 are disposed in holes 218 of hinge supporting members 217 such that members 217 abut shoulders 228 of sleeve 69. Sleeve 69 provides a spacing means to maintain the proper separation between hinge supporting members 217 and provides a bearing means for a pin 230, best shown in FIGS. 16 and 22, which is disposed through central bore 226. Pin 230 supports hinge member 60 as shown in FIG. 25.

Referring now to FIGS. 26-29, latch member 62 is made of an electrically insulating material and generally comprises base 260, side members 262, and fuse restraining end 268. Presently, polybutylene terephthalate ("PBT") is the preferred material for latch member 62. Side members 262 are attached to, and extend outwardly from, base portion 260 and include ears 264 formed at one end of side members 262. Aligned holes 266 are formed in ears 264 and as shown in FIG. 16, receive pin 252, such that latch member 62 is rotatably mounted about pin 252. Spring 63 is also mounted around pin 252 to bias latch member 62 towards the base portion 232 of hinge member 60. The free end of latch member 62 opposite ears 264 comprises fuse retaining end 268 which includes four upwardly extending fingers 269 positioned along the edge of retaining end 268. End 268 further includes a recess 270 which is located substantially in the center of end 268. A hole 272 is formed through end 268 substantially in the center of recess 270. Trigger wire 204 extending from fuse body 52 is disposed through hole 272 and hot-melt adhesively bonded, or otherwise suitably affixed to the bottom surface 263 of end 268 at connection point 271, best shown in FIG. 16. Base portion 260 of latch member 62 includes a raised segment 265 which extends upwardly from base 260 between sides 262. The end of raised segment 265 adjacent to ears 264 includes a latching surface 267 for engaging latch plate 66 as described in more detail below.

Referring now to FIGS. 16, 25, 30 and 31, latch plate member 66 is a generally flat metal plate having a projecting latch surface 276 for engaging latch member 62, a notch 278 for receiving clamping strap or tie 225 of connective member 64 and a key way 280 for engagement by a "hot stick" for use in installing and removing fuseholder 50. Latch plate 66 further includes a bore 282 for receiving sleeve 69 extending through holes 218 of hinge supporting member 217. Pin 230 passes through central bore 226 of sleeve 69 through and holes 236 of hinge member 60. Latch plate 66 is received by slot 254 of hinge member 60 and includes a stop shoulder 227 for limiting its rotation on pin 230 by engagement with pin 252. The rotatable mounting of connective member 64 and latch plate 66 about sleeve 69 together with the inter-engagement of the clamping strap or tie 225 within the notch 278 cause latch plate 66 to be non-rotatably anchored to clamp member 64 such that latch plate member 66 and connective member 64 will always rotate as a unit with current limiting fuse body 52 about the joint means, i.e. pin 230 and sleeve 69. In the contracted position of the hinge means, the latch surface 276 of latch plate member 66 will be received within the channel formed by side members 234 of hinge member 60. At that time, the free end of latch member 62 is rotated away from base portion 232 of hinge member 60 into engagement with lower end cap 180. In this position, the latch surface 276 of latch plate 66 engages latching surface 267 of the raised segment 265 of latch member 62. When so latched, the latch member 62 and latch plate member 66 retain the hinge means of hinge member 60 and connective member 64 in fixed angular relationship to one another in a contracted or charged position and prevent rotation about the joint means, i.e. pin 230 and sleeve 69. While the attachment of trigger wire 204 to end 268 of latch member 62 also serves to maintain a fixed angular relationship between hinge member 60 and connective member 64 when these members are in the charged position, the spring forces exerted by current interchange 68, spring clips 45, mounting cup contact 26, and the weight of fuseholder 50 and other external forces which may come to be applied to fuseholder 50 during handling, transportation, installation and service could be severe enough to break the connection between trigger wire 204 and latch member 62 or to sever wire 204. In such cases, the hinge assembly would extend prematurely such that fuseholder 50 could not be placed in service or, if already installed, causing it to drop out of engagement with the interchangeable cutout mounting.

Figure 32:
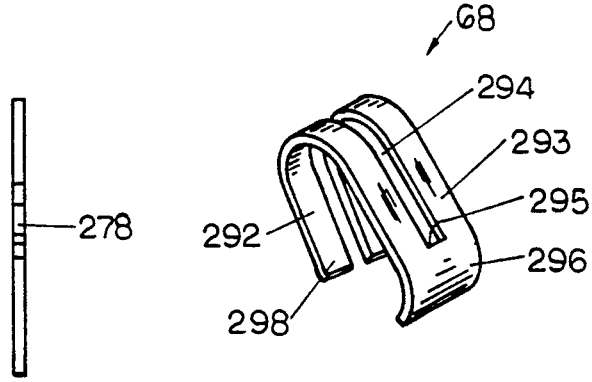
FIG. 32 is a perspective view of the current interchange.

Referring now to FIGS. 16, 25 and 32, pin 290 is disposed through bore 284 of latch plate member 66 and provides support for current interchange 68. Current interchange 68 is preferably formed of phosphor bronze, a good electrical conducting material that is also suitable for use as a spring. Current interchange 68 is U-shaped forming a pair of legs 292, 293. Slot 294 extends from one end of leg 292 to the midpoint of leg 293 where a bottom shoulder 295 is formed. As best shown in FIG. 32, leg 293 and shoulder 295 form a segment 296. Current interchange 68 comprises a means for conducting current between bottom cap 180 of fuse body 52 and hinge member 60. As shown in FIGS. 16 and 25, legs 292, 293 straddle latch plate member 66, and are supported on pin 290 projecting from latch plate member 66 as shown in FIG. 16. Connecting segment 296 electrically engages bottom end cap 180 while ends 298 of current interchange 68 electrically engage the shoulder formed by the ends 258 of legs 256 of hinge member 60 as shown best in FIG. 16.

Referring still to FIG. 16, current interchange 68 is disposed about pin 230. When engaged between fuse body 52 and hinge 60, current interchange 68 acts as a spring and imparts approximately 12 inch-pounds of torque between hinge 60 and fuse body 52 which assists hinge member 60 to rotate to its extended position to allow fuseholder 50 to drop out of engagement with interchangeable cutout mounting 10.

The installation of current limiting fuseholder 50 in interchangeable cutout mounting 10 and the operation of the lower cap and hinge assembly 58 is best described with reference to FIGS. 1, 17 and 33-35.

Figure 33:
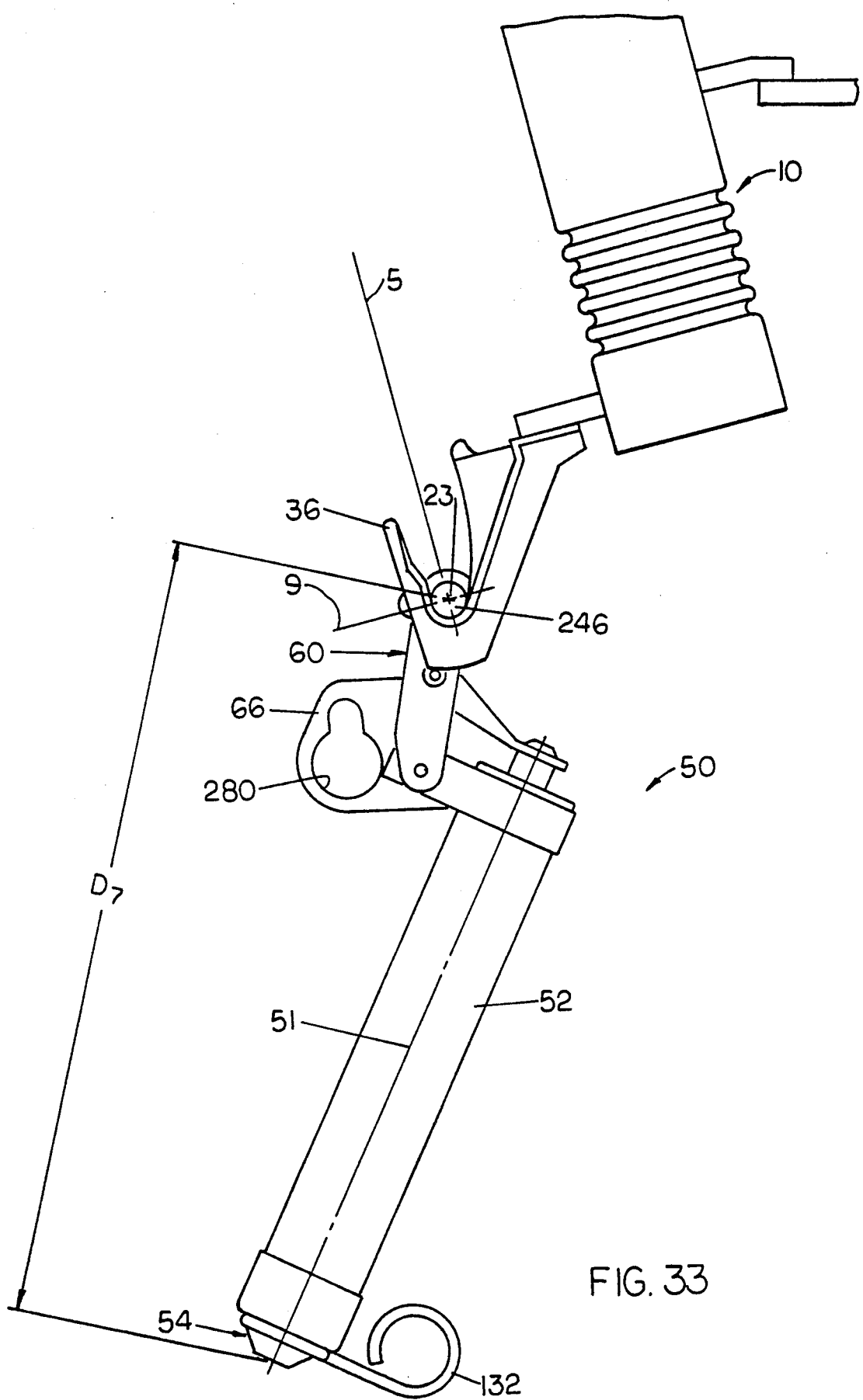
FIG. 33 is a partial side elevational view of the fuseholder in its lower, extended position, with the hinge joint in its contracted and latched position.

Referring first to FIG. 33, fuseholder 50 is shown with hinge member 60 and connective member 64 in their contracted and charged position, and with latch and latch plate members 62, 66 latched for the first stage of installation in interchangeable cutout mounting 10. So latched, fuseholder 50 is in its extended position. In this position, a fuseholder 50 for installation in a 15 KV rated interchangeable cutout mounting 10 should have an overall length $D_7$ (as shown in FIG. 33) of 12 inches or less, and preferably approximately 11 9/16 inches. Fuseholder 50 for installation in a 27 KV rated interchangeable cutout mounting 10 should have a overall length $D_7$ of 15⅜ inches or less, and preferably approximately 14 15/16 inches.

To install fuseholder 50, a lineman or other utility technician will lift fuseholder 50 by latch plate 66 using a "hot stick" or other insulative tool that is inserted into key way 280. Using the insulative tool, trunions 246 of hinge 60 are hung on hanger arms 36 of interchangeable cutout mounting 10 such that trunion axis 247 passes through the center 23 of clevis 21. To complete the installation, the lineman will then rotate fuseholder 50 about trunions 246 by using the insulative tool which is now hooked through pull ring 132.

Referring now to FIG. 1, by pushing with the insulative tool against pull ring 132, upper cap assembly 54 of fuseholder 50 engages upper terminal assembly 16 of interchangeable cutout mounting 10, with load break hook guide arms 24 of upper terminal assembly 16 guiding fuseholder 50 such that top contact 56 engages cup contact 26. When so installed, the hinge means is in its cocked or contracted position and current is conducted from upper terminal 16 through fuseholder 50 to lower terminal assembly 18 by means of bottom end cap 180, current interchange 68, hinge member 60 and conducting spring clips 45 to mounting hinge 35 of lower terminal assembly 18.

Figure 17:
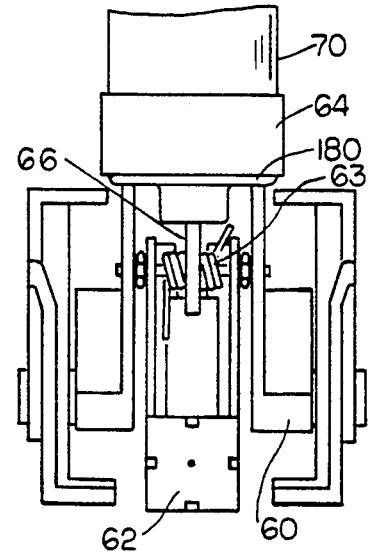
FIG. 17 is an end elevational view of the lower cap and hinge assembly shown in an unlatched position.
Figure 26:
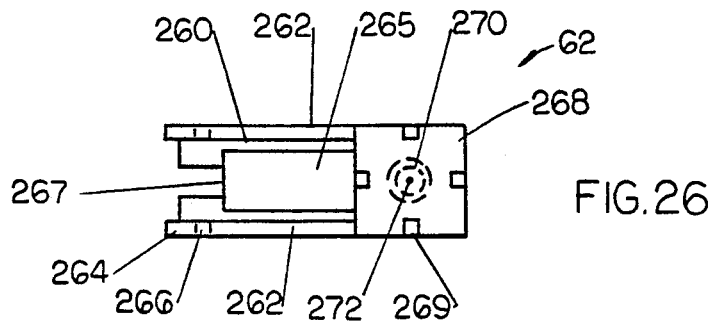
FIG. 26 is a top view of the latch member.
Figures 27, 28:
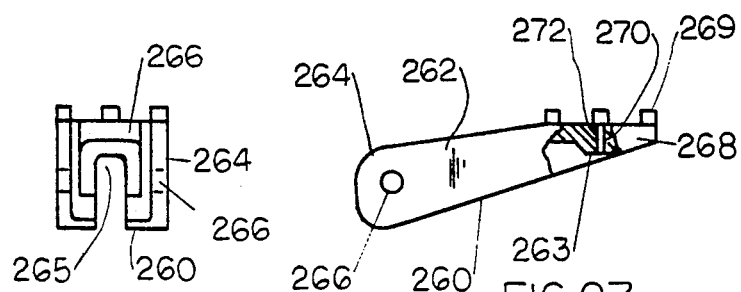
FIG. 27 is a side view of the latch member shown in FIG. 26.
FIG. 28 is one end view of the latch member shown in FIG. 26.
Figure 29:
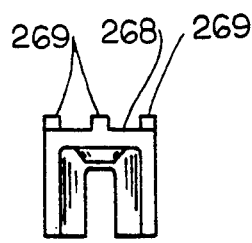
FIG. 29 is the other end view of the latch member shown in FIG. 26.
Figures 30, 31:
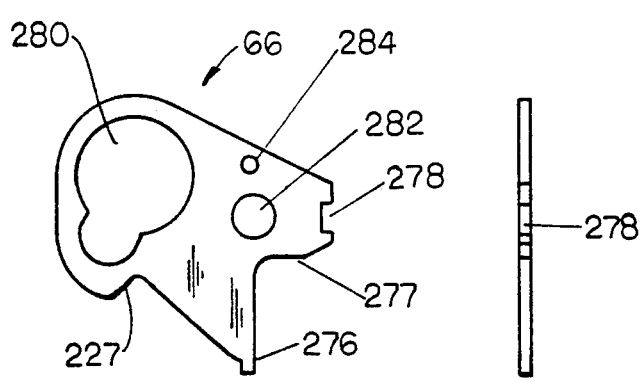
FIG. 30 is a side elevational view of the latch plate member.
FIG. 31 is an end elevational view of the latch plate member of FIG. 30.

Referring now to FIGS. 13 and 17, when current limiting fuseholder 50 experiences an overcurrent of a predetermined magnitude and duration, fusible elements 78 or 80 will fuse open. For an instant after this occurs, the overcurrent is conducted through fuseholder 50 to bottom end cap 180 via auxiliary wire 120, trigger wire 204 and spark gap 210 shown in FIG. 13. Nichrome trigger wire 204 has a high resistance and the high $I^2R$ heating, coupled with the heat generated by the arc across gap 210, causes trigger wire 204 to be severed, thereby acting as a release means for releasing and freeing latch member 62 from retainment by trigger wire 204. When this occurs, latch member 62, no longer held in contact with bottom end cap 180 by wire 204, will tend to rotate about pin 252 in a counterclockwise direction as viewed in FIG. 1 due to the spring force imparted by spring 63. FIG. 17 shows latch member 62 after it has rotated away from bottom end cap 80 immediately after trigger wire 204 has been severed.

Figure 34:
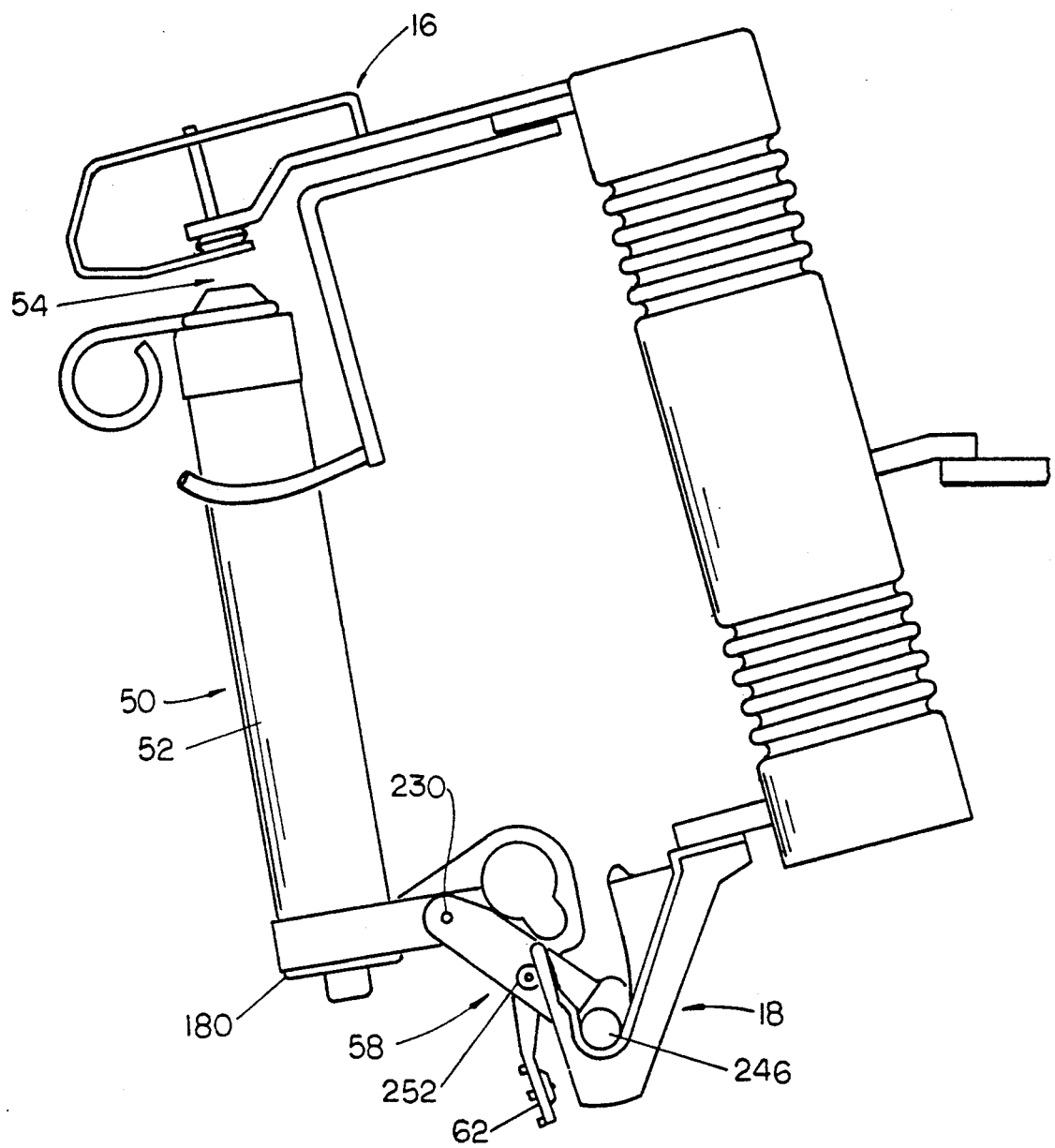
FIG. 34 is a side elevational view of the fuseholder in a contracted position with the hinge assembly unlatched and collapsed about the hinge joint.
Figure 35:
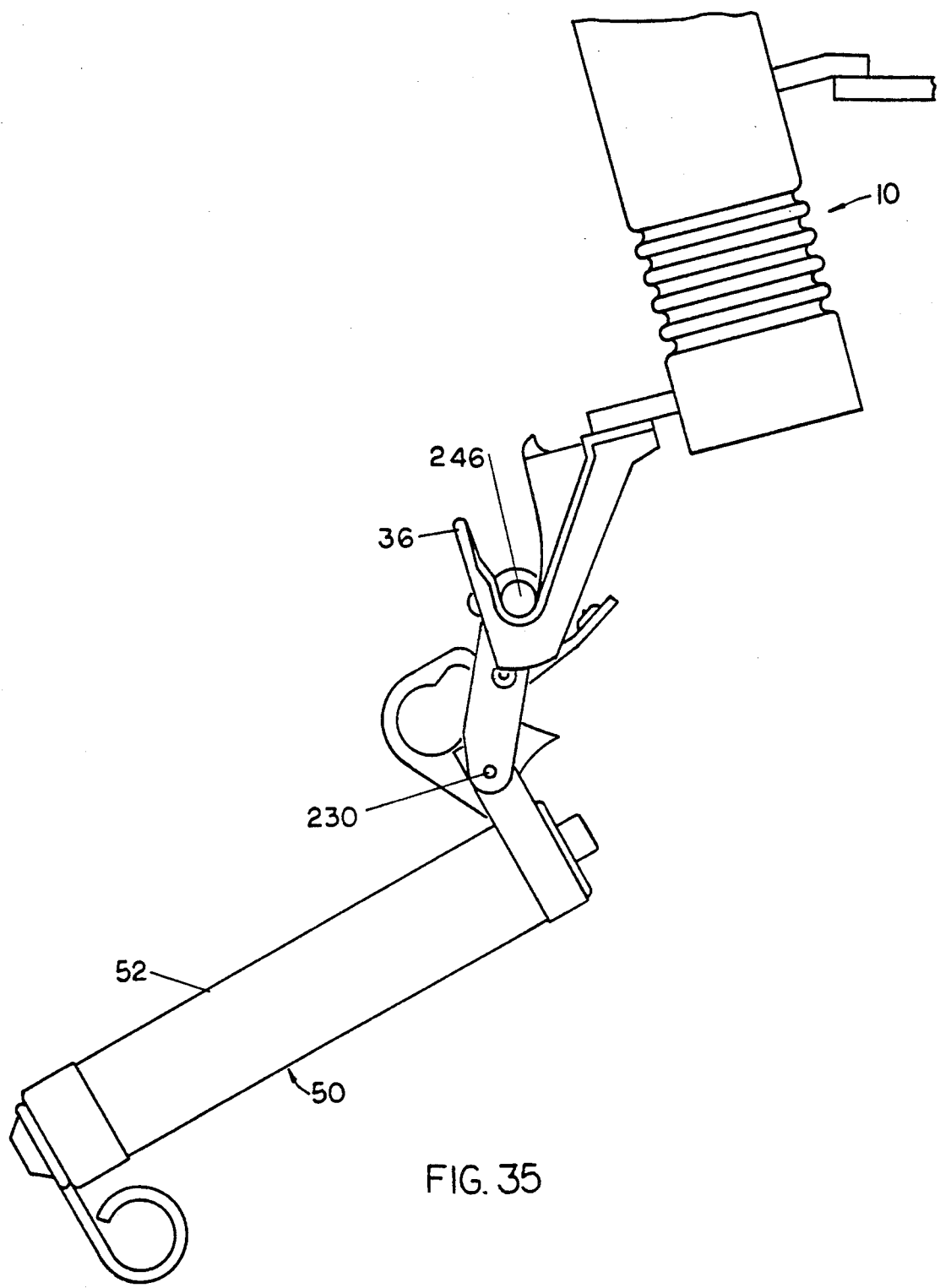
FIG. 35 is a side elevational view of the fuseholder in a position after the collapse of the hinge as shown in FIG. 34 and after rotation of the fuseholder within the interchangeable cutout mounting.

Referring now to FIGS. 34 and 35, the weight of fuseholder 50 and the forces imparted thereon by top terminal assembly 16 and conducting spring clips 45 of interchangeable cutout mounting 10 and the spring force from current interchange 68 will cause the lower cap and hinge assembly 58 to begin to collapse about pin 230 to an extended position and cause the upper cap assembly 54 of fuse body 52 to drop out of engagement with top terminal assembly 16 as shown in FIG. 34. When this occurs, fuse body 52 and lower cap and hinge assembly 58 will begin to rotate about trunion 246 in a counterclockwise direction as viewed in FIG. 34 until the fuseholder 50 reaches the dropout position and comes to rest on hanger arms 36 of interchangeable cutout 10, as shown in FIG. 35.

The dropout position that results from this mechanically actuated, explosionless dropout mechanism provides a clear and highly visible indication to linemen that the fuse has operated. The mechanism is free from reliance upon gunpowder or other explosive charges which, at times in the past, have proven unreliable. Additionally, by causing the fuseholder 50 to drop out of engagement with interchangeable cutout mounting 10 upon the occurrence of an overcurrent of a predetermined magnitude, voltage stress is thus removed from the actuated fuse. This voltage stress could otherwise eventually lead to tracking along the outer surface of the fuseholder 50, and possible ultimate flashover between the upper and lower terminal assemblies 16 and 18 of interchangeable cutout mounting 10.

Alternative embodiments of the present invention are disclosed in FIGS. 36-39 and include additional features that result in an improved current limiting fuse and current limiting fuseholder sized for mounting in existing interchangeable cutout mountings 10. These embodiments include many of the identical elements as previously shown and described. Accordingly, where like elements are shown, the identical reference numbers may be used.

Figure 36:
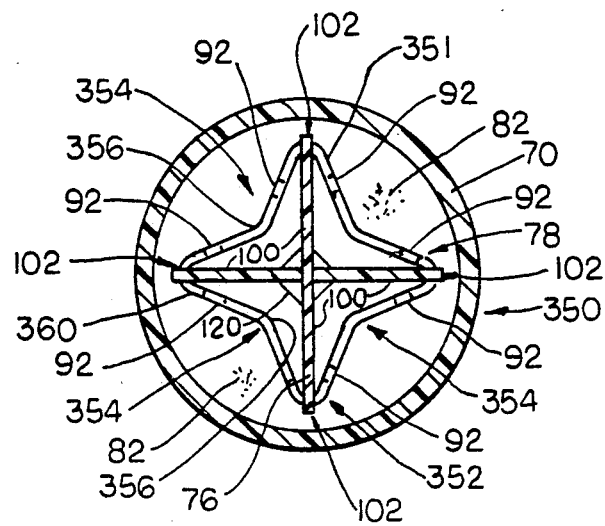
FIG. 36 is a cross-sectional view of an alternative embodiment of the current limiting fuse and fuseholder.

Referring now to FIG. 36, there is shown a current limiting fuse 350 generally comprising fuse tube body 70, spider 76 and high current fusible element 78. Fusible element 78 comprises silver ribbon 351 which is identical in structure to ribbon 90 previously described. Ribbon 351 is spirally wound about spider 76 as previously described with reference to ribbon 90 shown in FIGS. 2 and 3, one such winding turn 360 being depicted in FIG. 36. In contrast with the embodiment depicted in FIGS. 2 and 3, however, ribbon element 351 is wound about spider 76 in a star-like pattern 352 to include "V"-shaped segments 354 between adjacent spider arms 100. Reduced area portions 92 are disposed on each side of the innermost points 356 of "V"-shaped sections 354 at a location substantially equidistant between innermost point 356 and element support surface 102. This star winding pattern 352 for ribbon element 351 provides that each turn 360 of element winding achieves maximum available length and most efficiently utilizes the volume available within a cylindrical shaped fuse tube 70. Further this star winding pattern 352 provides for the largest portions of the fulgurites to be formed at locations more centrally disposed within fuse 350. This allows the outermost portion of the winding (the portion in contact with the element support surface 102 of arms 100) to be positioned closer to the wall of the fuse tube 70, allowing for an element winding of larger diameter than otherwise achievable, which again achieves a greater length of element 78 per turn 360 of winding. These features help make possible the construction of a smaller current limiting fuse body 52 than would otherwise be possible for the total length of element 78 required for a given application. This increased efficiency in the use of the fuse housing volume is particularly desirable for higher current and/or voltage rated fuses, since the volume required for such higher rated fuses increases at a much higher rate than can be achieved through the use of conventionally wound elements without increasing the length or diameter of the fuse body 52. Positioning reduced area portions 92 on "V"-shaped sections 354 further distances the longest-burning arcing segments of ribbon 351 from fuse tube 70 and from support surfaces 102 of spider 76. As described previously, this leads to better and more consistent current limiting fuse operation.

The "V"-shaped sections 354 and star pattern 352 can be achieved by winding ribbon element 351 by hand or machine about spider 76 by utilizing a means that forces and temporarily holds ribbon 351 in the proper depressed position at 356 between spider arms 100. Alternatively, star pattern 352 can be achieved by including an intermediate support surface (not shown) on spider 76 which allows ribbon 351 to be retained in its depressed position at point 356. The preferred method of achieving a star pattern winding 352 would be to pre-overform the element such then when the overformed element is properly positioned on the spider, the element would be self retaining in the star pattern 352.

Figure 37:
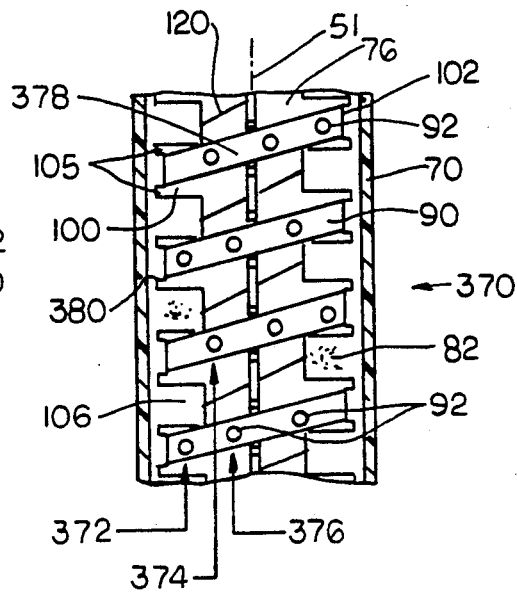
FIG. 37 is a partial cross-sectional view of another alternative embodiment of the current limiting fuse and fuseholder having staggered or alternatively positioned reduced area portions formed in the fuse element.

Another alternative embodiment of the invention is shown in FIG. 37. As shown, current limiting fuse 370 generally includes fuse tube 70 which houses spider 76 and ribbon element 90 which is wrapped about spider 76 on supporting surfaces 102 as previously described. Sand 82 fills the voids between these elements and fuse tube 70. In this embodiment, ribbon element 90 includes reduced area portions 92 which are spaced apart from support surfaces 102 and aligned in columns substantially parallel to fuse axis 51, such as columns 372, 374, 376. Ribbon element 90 includes adjacent ribbon segments 378 and 380. Reduced area portions 92 of ribbon segment 378 are offset from reduced area 92 of ribbon segment 380 in a direction substantially perpendicular to fuse axis 51 by a distance equal to the distance between columns 372 and 374 and between columns 374 and 376. As will be understood by those skilled in the art, to achieve this offset or staggered relationship between reduced area portions 92 in adjacent turns, while still maintaining the desired separation between reduced area portions 92 and spider support surfaces 102, reduced area portions 92 will not be uniformly spaced apart along the length of ribbon 90.

Figure 38:
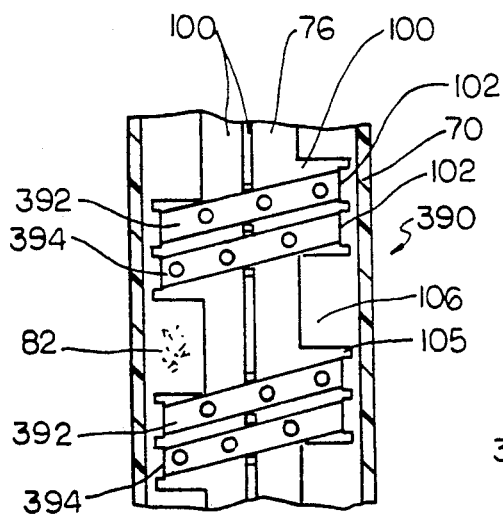
FIG. 38 is a partial cross-sectional view of the fuseholder with a current limiting fuse housed therein having parallel fuse elements, the elements having staggered or alternate positioned reduced area portions.

Referring briefly to FIG. 38, the same staggered or alternate positioning of reduced area portions 92 may be employed in current limiting fuses having higher current ratings and requiring parallel ribbon elements, such as current limiting fuse 390 shown in FIG. 38. Fuse 390 includes ribbon elements 392, 394 which are electrically connected in parallel. Ribbon elements 392, 394 each includes reduced area portions 92 that are offset from the reduced area portions 92 in the parallel element, and from the reduced area portions 92 in the closest ribbon element of the adjacent turn of elements, in the manner described in the preceding paragraphs. The staggering or offsetting of reduced area portions 92 in adjacent turns of elements 392, 394 (FIG. 38) and elements 378, 380 (FIG. 37) may also be combined with the star winding pattern 352 depicted in FIG. 36.

Figure 39:
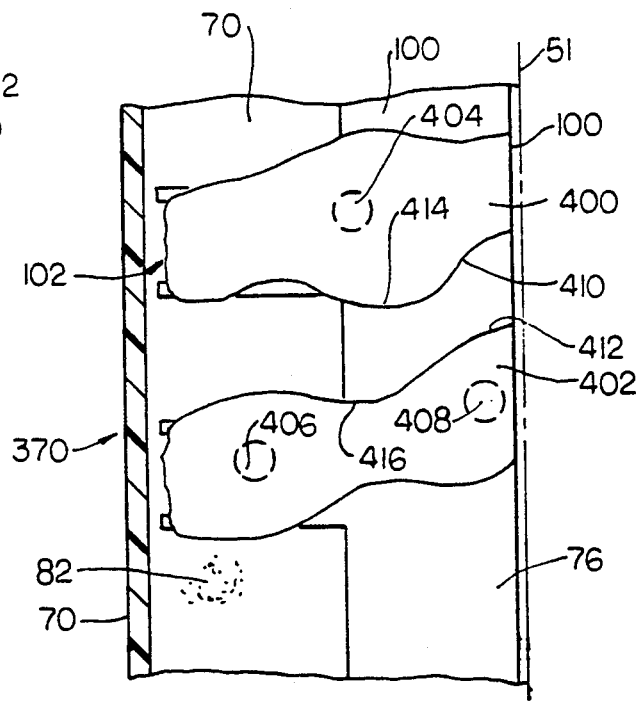
FIG. 39 is a side elevational view of the alternative embodiment of FIG. 37 with fulgurite developed adjacent the current limiting fuse element.

Referring again to FIG. 37, this offset or alternate positioning of reduced area portions 92 causes the outermost projecting portions of the fulgurites that develop in any one turn of element 90 to be positioned adjacent to the narrow-most sections of the fulgurite that develops in the adjacent turn as best shown in FIG. 39.

Referring now to FIGS. 37 and 39, fulgurite segments 400 and 402 are shown as they would likely exist after fuse 370 has operated to clear a high magnitude fault current. Fulgurite segment 400 is shown formed along the now-vaporized ribbon segment 378. Likewise, fulgurite segment 402 is formed in the space previously occupied by ribbon segment 380. Although reduced area portions 92 of ribbon segments 378 and 380 would no longer exist in fuse 370 after operating to clear a high magnitude fault current, the former locations of reduced area portions 92 are generally shown at locations 404, 406 and 408 in FIG. 39. As shown, fulgurite segments 400, 402 are largest at portions adjacent to locations 404, 406 and 408. This creates undulations along the length of fulgurite segments 400, 402 such as along adjacent surfaces 410 and 412 of fulgurite segments 400 and 402, respectively. As shown, surface 410 includes an extending surface 414 having a generally similar shape as recess 416 formed in fulgurite surface 412. In this manner, a minimum separation between adjacent fulgurite segments 400 and 402 is maintained between surfaces 410 and 412. This staggered or offset arrangement of the reduced area portions 92 provides for a "nesting" of the fulgurites which form about adjacent element turns. By requiring that the fulgurites nest upon formation, the ribbon elements 90 (and 392 and 394 in the case of the parallel windings of FIG. 38) may be wound about spider 76 with a minimum allowable separation between adjacent turns. As a result of the closer positioning of adjacent turns of the ribbon elements, fuses 370 and 390 may be made smaller than conventional current limiting fuses (either shorter or with a smaller diameter or both) and may be used in fuseholder 50 of the present invention as designed for use in interchangeable cutout mounting 10.

While the preferred embodiments of this invention have been shown and described, modifications thereof can be made by one skilled in the art without departing from the spirit of the invention. The embodiments described herein are exemplary only and are not limiting. Many variations and modifications of the system and apparatus are possible and are within the scope of the invention. Accordingly, the scope of protection is not limited by the above description, but is only limited by the claims which follow, that scope including all equivalents of the subject matter of the claims.

We claim:

1. A fuseholder for use in an industry-standard interchangeable cutout mounting having spaced apart top and bottom mounting arm assemblies, the fuseholder comprising:

a fuse body comprising an insulative fuse tube and a current limiting fuse element in said fuse tube, said fuse element comprising a first fusible element disposed within said fuse tube and adapted to actuate in response to current flow of a first predetermined magnitude, and a second fusible element disposed within said fuse tube and electrically in series with said first fusible element and adapted to actuate in response to a current flow of a said second predetermined magnitude;

an upper contact assembly on said fuse body;

a lower contact assembly on said fuse body;

said fuse body and said upper and lower contact assemblies being disposed between and engaging the mounting arm assemblies of the interchangeable cutout mounting.

2. The fuseholder of claim 1 wherein said upper and lower contact assemblies releasibly engage the mounting arm assemblies of the interchangeable cutout mounting.

3. The fuseholder of claim 2 wherein said upper contact assembly of said fuse body will drop out of engagement with the top mounting arm assembly of the interchangeable cutout mounting upon actuation of either of said fusible elements.

4. The fuseholder of claim 3 wherein:

said lower contact assembly comprises a hinge assembly rotatably engaging the bottom mounting arm assembly of the interchangeable cutout mounting; and said hinge assembly supporting said fuse body after said upper contact assembly of said fuse body drops out of engagement with the top mounting arm assembly of the interchangeable cutout mounting.

5. A current limiting fuseholder for use in an industry-standard interchangeable cutout mounting having spaced apart top and bottom mounting arm assemblies, comprising:

a current limiting fuse body;

an upper contact assembly on said fuse body;

a lower contact assembly on said fuse body;

said fuse body and said upper and lower contact assemblies being disposed between and releasibly engaging the mounting arm assemblies of the interchangeable cutout mounting;

wherein said upper contact assembly of said fuse body will drop out of engagement with the top mounting arm assembly of the interchangeable cutout mounting upon actuation of said fuse body; and wherein said fuse body is free of explosive charges.

6. The fuseholder of claim 1 wherein said fuseholder has an overall length of 12 inches or less as measured when said fuseholder and said contact assemblies are installed in the interchangeable cutout mounting.

7. The fuseholder of claim 1 wherein said fuseholder has an overall length of 15⅜ inches or less as measured when said fuseholder and said contact assemblies are installed in the interchangeable cutout mounting.

8. The fuseholder of claim 6 wherein said fuse body has an overall length of less than 9½ inches.

9. The fuseholder of claim 7 wherein said fuse body has an overall length of less than 13 inches.

10. A fuseholder for an interchangeable cutout mounting, comprising:

a fuse body;

a first contact assembly mounted on one end of said fuse body and a second contact assembly mounted on another end of said fuse body;

a fuse element disposed within said fuse body having a first terminal end electrically connected to said first contact assembly and a second terminal end electrically connected to said second contact assembly;

an auxiliary element disposed within said fuse body having a first end electrically connected to said first contact assembly and a second end electrically connected to a trigger wire, said trigger wire passing through an aperture in said second contact assembly and extending exteriorly of said fuse body, said auxiliary element and said trigger wire being insulated from said second contact assembly;

hinge means affixed to said second contact assembly and adapted for rotation on the interchangeable cutout mounting, said hinge means having a contracted position and an extended position;

said hinge means including a latch means for holding said hinge means in said contracted position;

said trigger wire being releasably connected to said latch means whereby upon release of said latch means by said trigger wire, said hinge means moves to said extended position causing said first contact assembly to electrically disengage the interchangeable cutout mounting.

11. The fuseholder of claim 10 wherein said hinge means comprises a hinge member adapted for rotatable mounting on the interchangeable cutout mounting;

a connective member supporting said fuse body, said fuse and auxiliary elements, and said contact assemblies; and a joint means for rotatably mounting said connective member to a first end of said hinge member.

12. The fuseholder of claim 11 wherein said connective member clamps around said second contact assembly.

13. The fuseholder of claim 12 wherein said connective member includes a strap portion extending around said second contact assembly and having a tie for tightening said strap portion around said second contact assembly.

14. The fuseholder of claim 12 wherein said connective member includes a clamp portion extending around said second contact assembly and support portions rotatably mounted to said joint means.

15. The fuseholder of claim 14 wherein said support portions of said connective member have aligned holes for receiving a pin sleeve therethrough.

16. The fuseholder of claim 11 wherein said hinge member has a second end with pivot means for rotatable engagement with the interchangeable cutout mounting.

17. The fuseholder of claim 16 wherein said pivot means includes trunions projecting from said second end of said hinge member.

18. The fuseholder of claim 11 wherein said hinge member includes electrical contact surfaces at said second end for electrical engagement with the interchangeable cutout mounting.

19. The fuseholder of claim 11 wherein said joint means includes a pin extending through aligned holes in said first end of said hinge member and support portions extending from said connective member.

20. The fuseholder of claim 1 wherein said hinge member includes a base member and a pair of sides forming a channel.

21. The fuseholder of claim 11 wherein said latch means includes a latch member rotatably mounted on said hinge member and a latch plate anchored to said connective member.

22. The fuseholder of claim 21 wherein said latch member includes a free end affixed to one end of said trigger wire.

23. The fuseholder of claim 21 wherein said latch plate includes a lever member which is engaged by said latch member to maintain said connective member in said contracted position when said latch member is affixed to said trigger wire.

24. The fuseholder of claim 11 further including contact means electrically connecting said hinge member and said second contact assembly.

25. The fuseholder of claim 11 further including spring means for biasing said hinge and connective members toward said extended position.

26. The fuseholder of claim 11 further including a spring contact member disposed between said hinge and second contact assembly about said joint means.

27. The fuseholder of claim 21 further including means for biasing said latch member toward said hinge member.

28. A fuseholder for a current limiting fuse disposed on an interchangeable cutout mounting, comprising:

a hinge member having first and second sides projecting from a base to form a channel, said sides having first and second ends, one end of said base extending at an angle between said sides adjacent said first ends to form a shoulder therebetween, said base having a slot extending from said shoulder to a medial point of said base, said sides having aligned first holes through said first ends and aligned second holes adjacent said medial point, said first and second sides each having a trunion projecting exteriorly of said channel adjacent said second ends, said trunions adapted for rotatable engagement with the interchangeable cutout mounting;

a latch member rotatably mounted on a first pin extending through said second holes rotatably disposing said latch member within said channel, said latch member having a free end projecting from said channel;

spring means biasing the rotation of said latch member toward said base within said channel;

release means releasably connected to said free end of said latch member and adapted for connection with the current limiting fuse;

a clamp member adapted for extending around the current limiting fuse and having ends with apertures, said ends rotatably mounted between said sides of said hinge member on a second pin extending through said first holes of said sides, a tie pin extending through said clamp member adjacent the fuse for clamping the fuse to said clamp member;

a latch plate having a projecting trigger end and a bore for rotatably mounting said latch plate on said second pin, said latch plate having a notch receiving said tie pin whereby said latch plate rotates on said second pin with said clamp member and thus the fuse, said latch plate being slidably received within said slot of said hinge member whereby said latch plate projects through said channel of said hinge member, said latch plate having a stop shoulder for engaging said first pin to limit the rotation of said latch plate on said second pin;

a current interchange having a U-shape forming first and second ends and a longitudinal passageway extending from a terminus on said first end to a bottom shoulder on said second end, said current interchange being received over said latch plate as said latch plate is received within said passageway until said bottom shoulder engages said latch plate, said latch plate having a mounting pin extending therefrom and through said current interchange between said first and second ends for maintaining said current interchange in position, said ends being disposed between said hinge member and said clamp member, said terminus of said first leg resting on said shoulder of said hinge member and said second end adapted for electrically engaging one end of the fuse;

said hinge member and clamp member having a cocked position and a released position;

in said cocked position, said clamp member and thus said latch plate being hinged toward said hinge member on said second pin whereby the fuse is electrically mounted on the interchangeable cutout mounting, said latch plate being held in said cocked position by rotation on said first pin of said latch member into engagement with said trigger end of said latch plate to prevent its rotation on said second pin, said free end of said latch member held in engagement with the fuse by said release means;

upon actuation of said release means, said clamp member and latch plate move to said released position where said latch member disengages said latch plate to allow rotation of said clamp member and latch plate;

said current interchange acting as a spring between said hinge member and said clamp member to bias said clamp member from said cocked position to said released position.

29. An electrical circuit interrupting device, comprising:

a pair of electrical terminal assemblies for engagement with a current interrupter;

insulator means for supporting said terminal assemblies in spaced-apart, insulated relationship to one another, said terminals being spaced-apart the distance equal to the dimension between the terminals of an industry standard interchangeable cutout mounting;

a current limiting, nonexpulsion, full range current interrupter for normally bridging between and electrically interconnecting said terminal assemblies; and means for releasably mounting said current interrupter in-gate between said terminals and for permitting said interrupter to slip out of said normal bridging position between said terminals in response to current flow through said interrupter of either a first predetermined magnitude and duration or a second predetermined magnitude and duration, said current limiting interrupter comprising:

a fuse body;

a first fuse element disposed within said fuse body and adapted to actuate in response to current flow between said terminals of a first predetermined magnitude and duration;

a second fuse element disposed within said fuse body and electrically in series with said first fuse element and adapted to actuate in response to a current flow between said terminals of a second predetermined magnitude and duration.

30. A contact and hinge assembly for attachment to a fuse body having a conductive end cap, said assembly comprising:

a conductive hinge member;

a connective member having a first end rotatably connected to said hinge member and a second end connected to the fuse body;

joint means rotatably linking said hinge member and said connective member;

a latch member rotatable between a supporting position and non-supporting positions, said latch member having a first end rotatably attached to said hinge member and a second end adapted for supporting the fuse body when said latch member is positioned in said supporting position; and means for retaining said latch member in said supporting position until a current of a predetermined magnitude is conducted through the fuse body.

31. The assembly of claim 30 wherein said retaining means comprises a wire extending from the fuse body and attached to said second end of said latch member.

32. The assembly of claim 31 wherein said assembly further comprises a spark gap between said wire and the conductive end cap of the fuse body.

33. The assembly of claim 31 wherein said retaining means further comprises:

a latching surface formed on said latch member; and a latch plate connected to said connective member having a latching surface engaging said latching surface of said latch member when said latch member is in said supporting position.

34. The assembly of claim 30 further comprising a conductive spring member having a first end electrically engaging said hinge member and a second end electrically engaging the conductive end cap of the fuse body for conducting current between the end cap and said hinge member when said latch member is in said supporting position and for biasing said hinge member and said connective member and causing said members to rotate about said joint means when said latch member rotates away from said supporting position.

35. The assembly of claim 30 further comprising a spring means disposed between said latch member and said hinge member for biasing said latch member away from said supporting position.

36. The assembly of claim 30 wherein said second end of said latch member is comprised of an insulative material.

37. The assembly of claim 31 wherein said second end of said latch member includes a hole formed therethrough and wherein said wire is disposed through said hole.

38. A drop out style fuseholder comprising:

a fuse body including first and second conductive terminals on said body;

a fuse element disposed within said body between said first and second terminals;

a hinge assembly connected to said fuse body and moveable between a contracted and an extended position;

a trigger wire extending from said fuse body and attached to said hinge assembly for retaining said hinge assembly in said contracted position until actuation of said fuse element.

39. The fuseholder of claim 38 further comprising means for severing said wire upon actuation of said fuse element.

40. The fuseholder of claim 39 further comprising means for biasing said hinge assembly from said contracted position to said extended position upon said wire being severed by said severing means.

41. The fuseholder of claim 39 wherein said severing means comprises a spark gap formed between said wire and said second terminal.

42. The fuseholder of claim 41 wherein said second terminal includes an aperture and wherein said wire is disposed through said aperture, said spark gap being formed between said wire and the edge of said aperture.

43. The fuseholder of claim 41 wherein said severing means further comprises an auxiliary fuse element in said fuse body electrically connected between said first terminal and said trigger wire.

44. The fuseholder of claim 40 wherein said biasing means comprises a spring member for conducting current from said fuse body to said hinge assembly.

45. The fuseholder of claim 38 wherein said hinge assembly comprises:

a connective member attached to said fuse body;

a hinge member rotatably connected to said connective member; and means for retaining said hinge member and said connective member in a first angular position relative to each other when said hinge assembly is in said contracted position.

46. The fuseholder of claim 45 wherein said retaining means comprises:

a latch member rotatably attached to said hinge member; and a means for connecting said trigger wire to said latch member.

47. The fuseholder of claim 46 further comprising a means for severing said trigger wire from said latch member upon actuation of said fuse element.

48. The fuseholder of claim 47 wherein said hinge assembly further comprises a means for biasing said rotatable latch member away from said fuse body upon said trigger wire being severed by said severing means.

49. The fuseholder of claim 45 wherein said hinge assembly further comprises a means for biasing said hinge member and said connective members to a second relative angular position upon actuation of said fuse element.

50. The fuseholder of claim 49 wherein said biasing means comprises a conductive spring member for conducting current from said fuse body to said hinge member.

51. The fuseholder of claim 46 wherein said hinge assembly further comprises a latch plate and wherein said retaining means further comprises a latch surface on said rotatable latch member, said latch plate engaging said latch surface on said latch member when said latch member is connected to said trigger wire.

52. The fuseholder of claim 38 wherein said fuse element comprises a first fusible element adapted to actuate in response to current flow between said conductive terminals of a first predetermined magnitude, and a second fusible element adapted to actuate in response to current flow between said conductive terminals of a second predetermined magnitude.

* * * * *